United States Patent
Raja et al.

(10) Patent No.: US 7,734,777 B2
(45) Date of Patent: Jun. 8, 2010

(54) SYSTEMS AND METHODS FOR MONITORING COMPONENTS OF A REMOTE ACCESS SERVER FARM

(75) Inventors: Murali Raja, Bangalore (IN); Sandeep Kamath, Bangalore (IN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 12/546,223

(22) Filed: Aug. 24, 2009

(65) Prior Publication Data

US 2009/0307351 A1    Dec. 10, 2009

Related U.S. Application Data

(63) Continuation of application No. 12/236,016, filed on Sep. 23, 2008.

(60) Provisional application No. 60/977,996, filed on Oct. 5, 2007.

(51) Int. Cl.
*G06F 15/173* (2006.01)
*G06F 15/16* (2006.01)

(52) U.S. Cl. .................... 709/224; 709/202
(58) Field of Classification Search ............. 709/202, 709/224
See application file for complete search history.

(56) References Cited

U.S. PATENT DOCUMENTS

| | | | |
|---|---|---|---|
| 6,915,344 B1 | 7/2005 | Rowe et al. | |
| 6,952,715 B1 * | 10/2005 | Kronz | 709/203 |
| 7,299,276 B1 | 11/2007 | Strawn | |
| 7,313,735 B1 | 12/2007 | Levergood et al. | |
| 2007/0150595 A1 * | 6/2007 | Bhorania et al. | 709/226 |
| 2008/0126856 A1 * | 5/2008 | Levidow et al. | 714/19 |
| 2009/0204728 A1 * | 8/2009 | Prall | 710/11 |

* cited by examiner

*Primary Examiner*—Kenny S Lin
(74) *Attorney, Agent, or Firm*—Choate, Hall & Stewart LLP

(57) ABSTRACT

The present application is related methods to monitor a state of one or more components of a remote access server farm by an intermediary to distinguish between operating and functional components and improve farm availability for user application requests. The intermediary may be deployed between a client and the remote access server farm and forwards client requests to functional components of the remote access server farm.

20 Claims, 26 Drawing Sheets

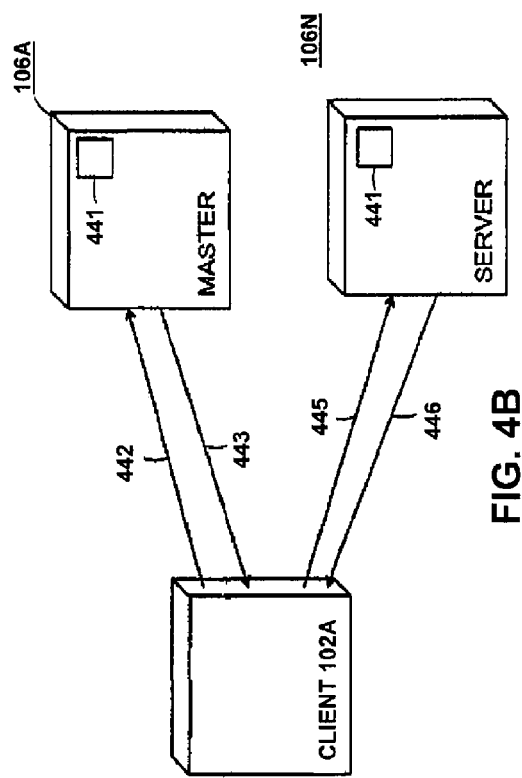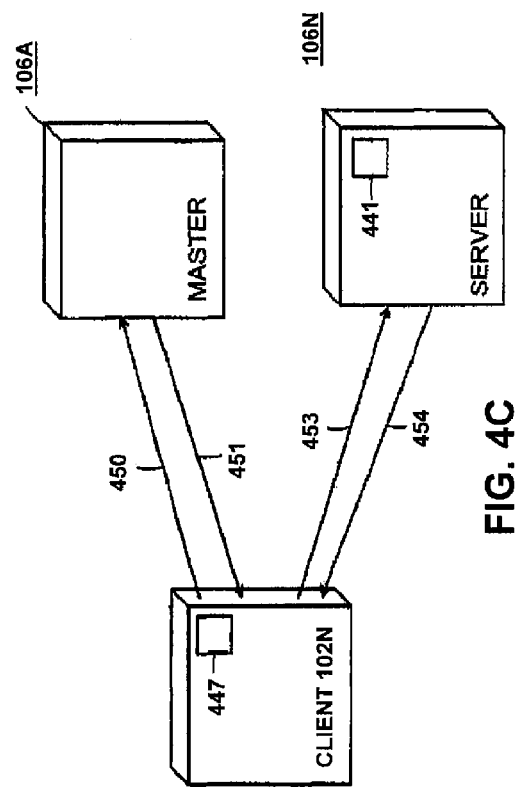

SYSTEMS AND METHODS FOR MONITORING COMPONENTS OF A REMOTE ACCESS SERVER FARM

RELATED APPLICATIONS

This application claims priority and is a continuation of U.S. application Ser. No. 12/236,016, "Systems and Methods of Monitoring Components of a Remote Access Server Farm," filed Sep. 23, 2008, which claims priority to and is a non-provisional of U.S. Application No. 60/977,996, "Systems and Methods of Monitoring Components of a Remote Access Server Farm," filed Oct. 5, 2007, which are incorporated by reference in their entirety.

FIELD OF THE INVENTION

The present application generally relates to data communication networks. In particular, the present application relates to systems and methods for monitoring the operational and functional state of components of a remote access server farm.

BACKGROUND OF THE INVENTION

Users may access one or more applications via a remote access server farm. For example, a corporate network may include one or more data centers each with a remote access server farm. The remote access server farm may include multiple access or infrastructure components for managing access to the server farm. The corporate entity may deploy these components via one or more servers. As such, the user may access these applications via one or more servers deploying multiple components to gain access to the server farm of the data center. To complicate matters, these components, servers and server farms may be located in different locations and managed by different internal and external personnel.

Any one of these multiple components may have an error. In some cases, these errors may not be trapped or otherwise readily apparent to any of the administration personnel. For example, a component may be running or executing or a server but providing invalid responses. These types of untrapped errors may be challenging for the administration personnel to find. Furthermore, to resolve these errors the administration personnel may need to coordinate multiple other personnel to diagnose and repair the condition. With any of these components having an error, the user's access to the remote access server farm may be hindered or performance degraded.

BRIEF SUMMARY OF THE INVENTION

The present solution is directed towards monitoring and determining a state of one or more components of a remote access server farm by an intermediary to distinguish between operating and functional components and improve farm availability for user application requests. The intermediary may be deployed between a client and the remote access server farm and forwards client requests to functional components of the remote access server farm. For example, one or more appliances may be deployed between a client and a Web Interface broker to a Citrix Presentation Server farm, and between the Web Interface Broker and XML interface service to the Citrix Presentation Server Farm. The appliances may monitor these components of the server farm to determine whether or not the Web Interface and XML Interfaces services are operation and functional. These services may be considered functional based on responses from the services having certain expected content that indicate the service is functioning. The appliance may determine a component is not functional based on the monitored response and remove the non-functional component from consideration in traffic management decisions. In this manner, the appliance avoids forwarding requests to non-functional components of the remote access server farm.

In one aspect, the present invention is related to a method to monitor a state of one or more components of a remote access server farm by an intermediary to distinguish between operating and functional components and improve farm availability for user application requests. The intermediary may be deployed between a client and the remote access server farm and forwards client requests to functional components of the remote access server farm. The method includes transmitting, by one or more monitoring agents of the intermediary, a request for availability of a predetermined application to each of a plurality of interface services providing an enumerated list of published applications available via a server in the remote access server farm. A monitoring agent of the one or more monitoring agents receives a first response to the request from a first interface service. The first response includes a host identifier of a server of the remote access server farm available for providing the predetermined application. From the first response, the intermediary identifies the first interface service as operational and functional. A monitoring agent of the intermediary receives a second response to the request from a second interface service. The second response does not identify a host of the remote access server farm for providing the predetermined application. In response to the second response, the intermediary determines, the second interface service is operational and not functional. The interface service may include an XML service providing the enumerated list of published applications available from a presentation server farm.

In some embodiments, the method includes not receiving by the intermediary the second response from the second interface service and determining the second interface service is not operational. In another embodiment, the intermediary excluded operations and not functional interface servers in a load balancing rotation of interface services. In other embodiments, the intermediary includes operational and functional interface services in a load balancing rotation of interface services. In one embodiment, the monitoring agent receives the first response providing the host identifier of the least loaded server in the remote access server farm.

In another embodiment, the intermediary receives a request from a client for an enumerated list of published applications available from the remote access server farm, and determines to distribute the client request to a functional and operational interface service of the plurality of interface services. In some embodiments, the intermediary receives a third response from the second interface service. The third response includes the host identifier of the server from the remote host server farm for providing the predetermined application. The intermediary determines from the third response that the second interface service is operational and functional. In some embodiments, the monitoring agents further transmit the request to include an indication to not adjust a load of a server in the remote access server farmer based on the request.

In one embodiment, the intermediary determines from the first response a host cache on the server providing the first interface service is valid. The intermediary may also determine from the first response one of a service or a dynamic store of a zone data collector of the remote access server farm is one of functional or valid. In another embodiment, the intermediary determines from the first response a presentation server of the remote access server farm is available with the requested application.

In another aspect, the present invention is related to a method to monitor a state of one or more components of a remote access server farm by an intermediary to distinguish between operating and functional components and improve farm availability for user application requests. The intermediary may be deployed between a client and the remote access server farm and forwarding client requests to functional components of the remote access server farm. The method includes transmitting by one or more monitoring agents of the intermediary a predetermined default web interface page to each of a plurality of web interfaces providing a browser based depiction of the remote access server farm. A monitoring agent of the one or more monitoring agents receives a first response to the request from a first web interface. The first response includes a header identifying a setting of a cookie. The intermediary identifies from the first response the first web interface as operational and functional. The intermediary via received a second response to the request from a second web interface. The second response does not include the header identifying the setting of the cookie. The intermediary determines from the second response the second web interface is operational and not functional. The intermediary transmits a request from the client to an operational and functional web interface of the plurality of web interfaces.

In some embodiments, the intermediary does not receive the second response from the second web service, and determining the second web service is not operational. In one embodiment, the intermediary excludes operational but not functional web interfaces in a load balancing rotation of web interface services. In another embodiment, the intermediary includes operational and functional web interfaces in a load balancing rotation.

In other embodiments, the intermediary receives a third response from the second web interface. The third response includes the header identifying the setting of the cookie. The intermediary determines from the third response the second web interface is operational and functional. In various embodiments, the first web interface or the second web interface transmits a request to an interface service for an enumerated list of published applications available from the remote access server farm. In one embodiment, a second intermediary receives the request for the interface service, and distributes the request to one of a plurality of interface services identified by the second intermediary as functional and operational. The intermediary via one or more monitoring agents may monitor responses to the request from the plurality of web services to determine the responses comprises a predetermined response code indicating the web service is functional. In some embodiments, the intermediary determines the responses include a predetermined response string indicating the web service is functional.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 4B is a block diagram illustrating an embodiment of a process by which one of the server nodes may initiate execution of an application program for determining the program neighborhood of a client node;

FIG. 4C is a block diagram illustrating an embodiment of a process by which a client node may initiate execution of an application program for determining the program neighborhood of that client node;

Figure 1A:
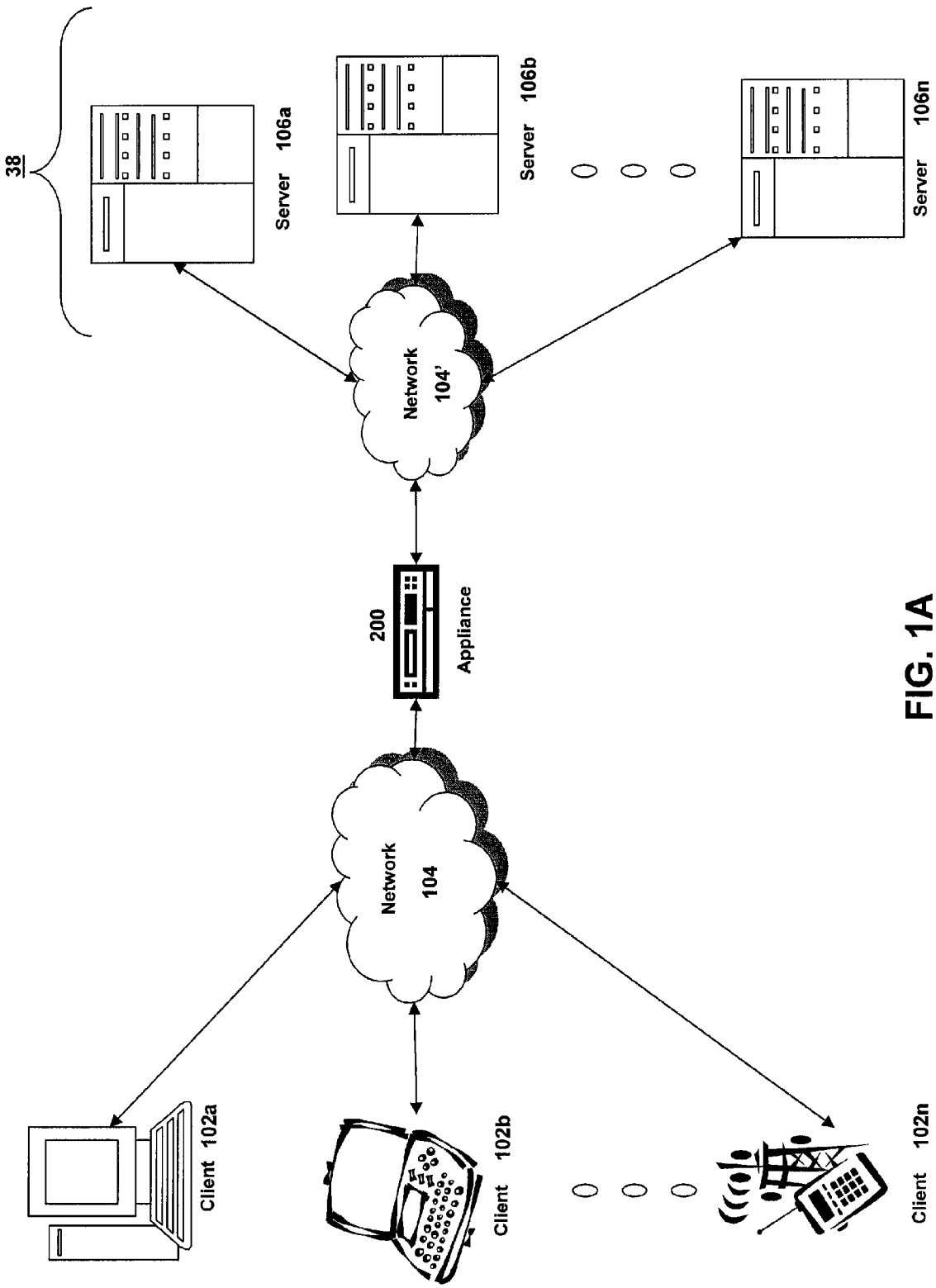
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server;

Section D describes embodiments of systems and methods for providing a Program Neighborhood and Access to Remote Access Server Farm;

Section E describes embodiments of systems and methods for load balancing components of a remote Access Server farm; and Section F describes embodiments of systems and methods for monitoring operational and functional state of components of the remote access server farm.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104, 104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
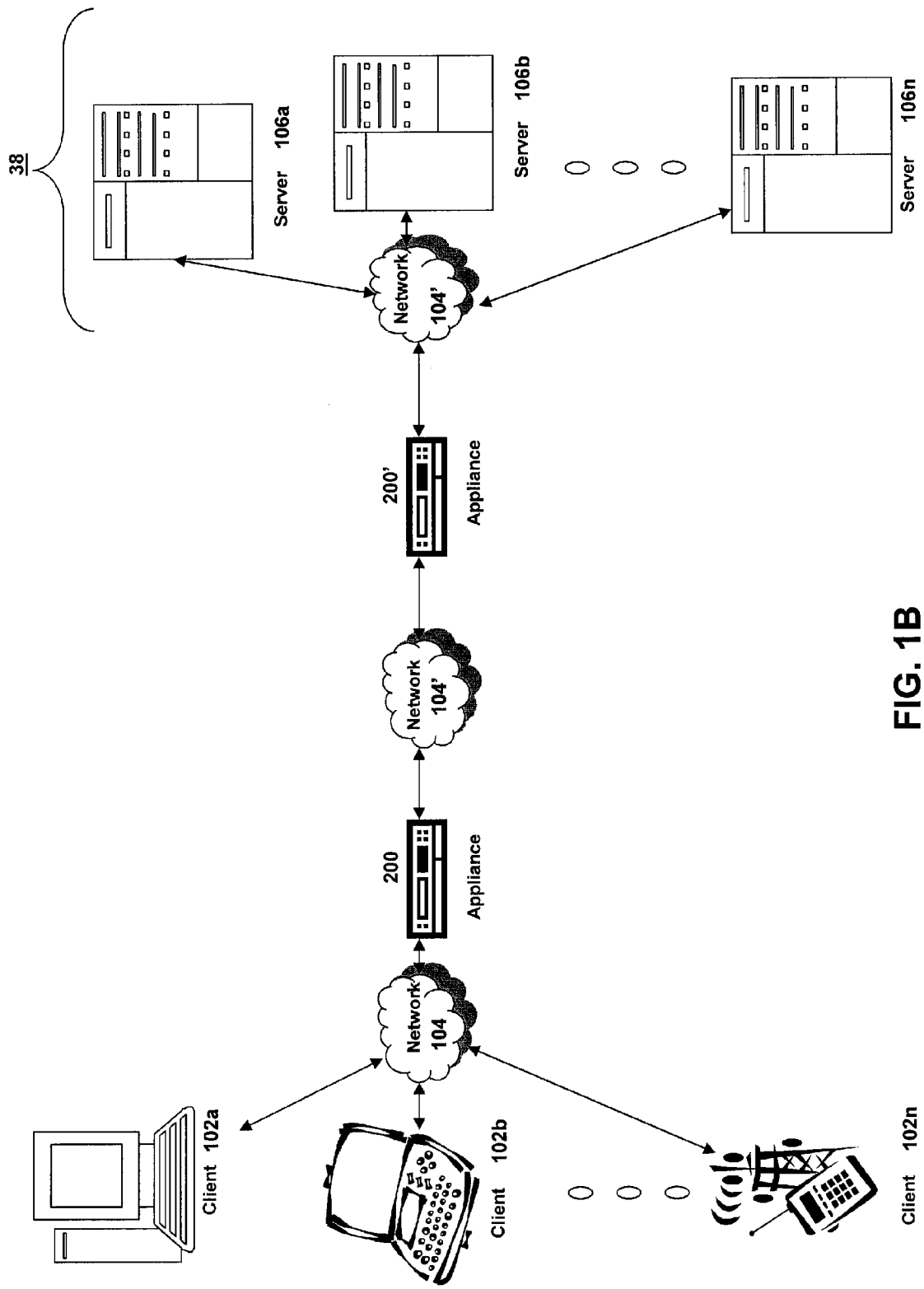
FIG. 1B is a block diagram of an embodiment of an environment for delivering a computing environment from a server to a client via an appliance.
Figure 1C:
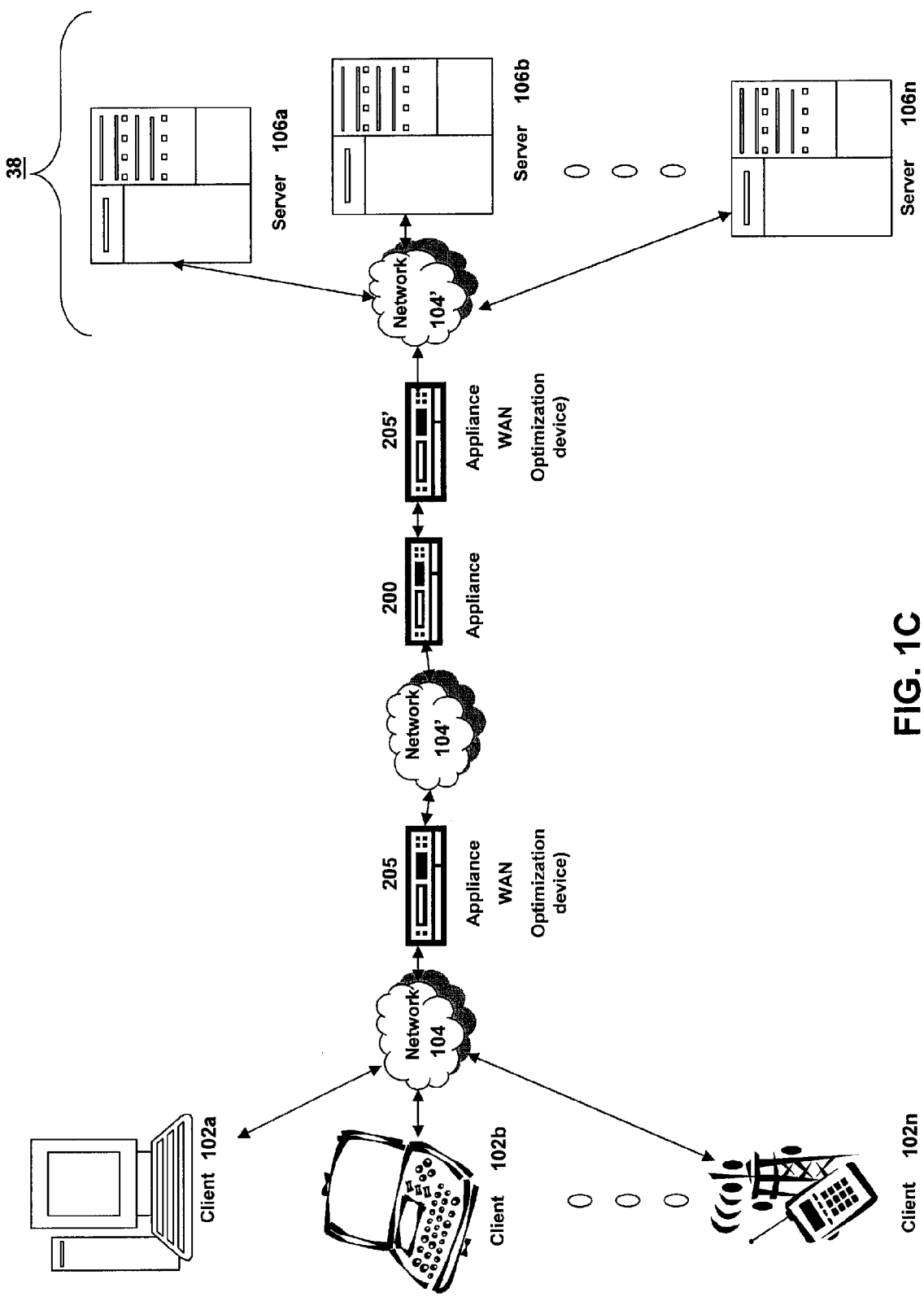
FIG. 1C is a block diagram of an embodiment of an environment for delivering a computing environment from a server to a client via a plurality of appliances.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
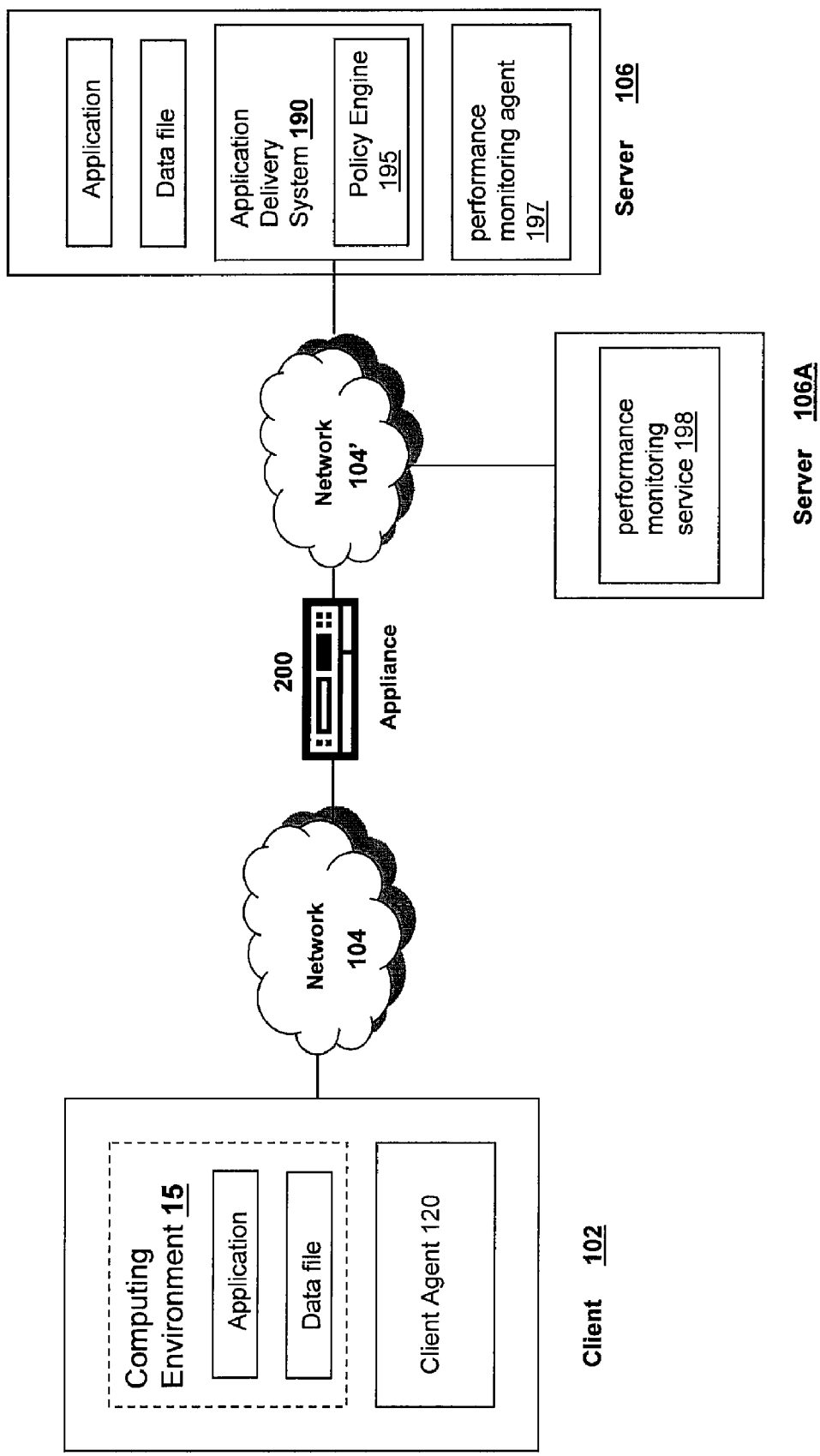
FIG. 1D is a block diagram of an embodiment of an environment for delivering a computing environment from a server to a client and having a performance monitoring service.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
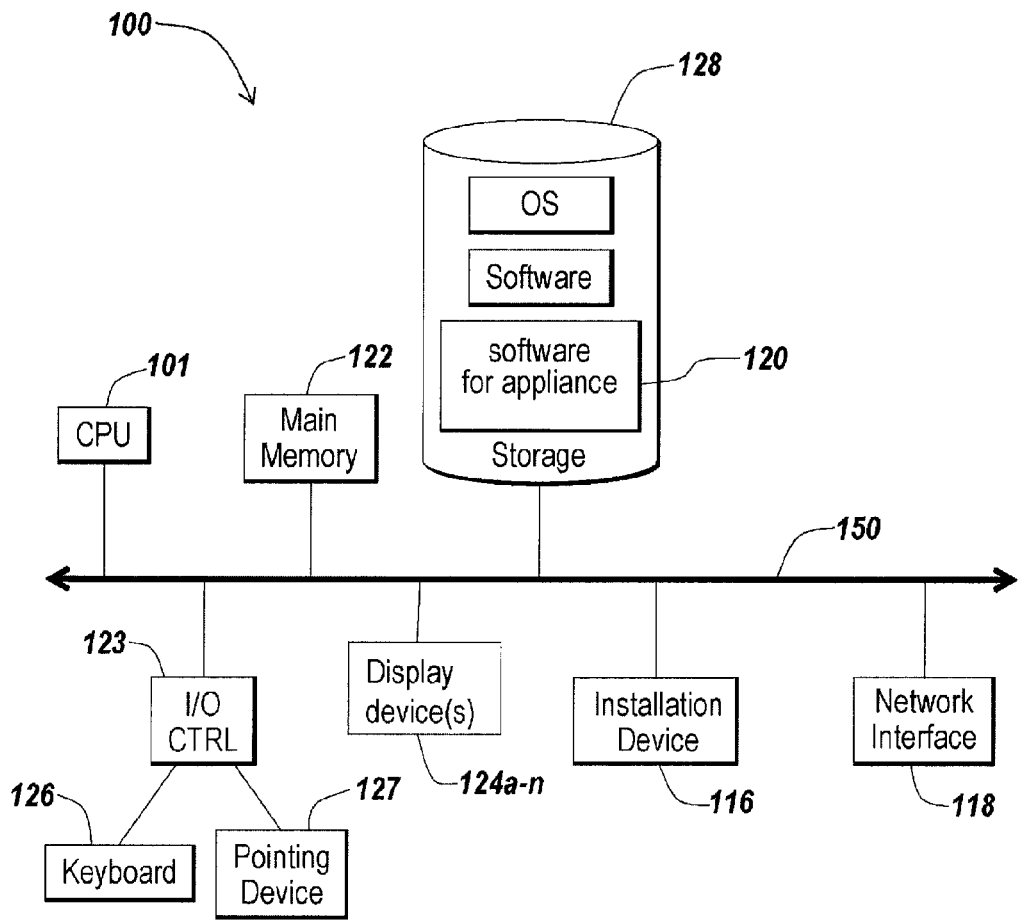
FIGS. 1E and 1F are block diagrams of embodiments of a computing device.
Figure 1F:
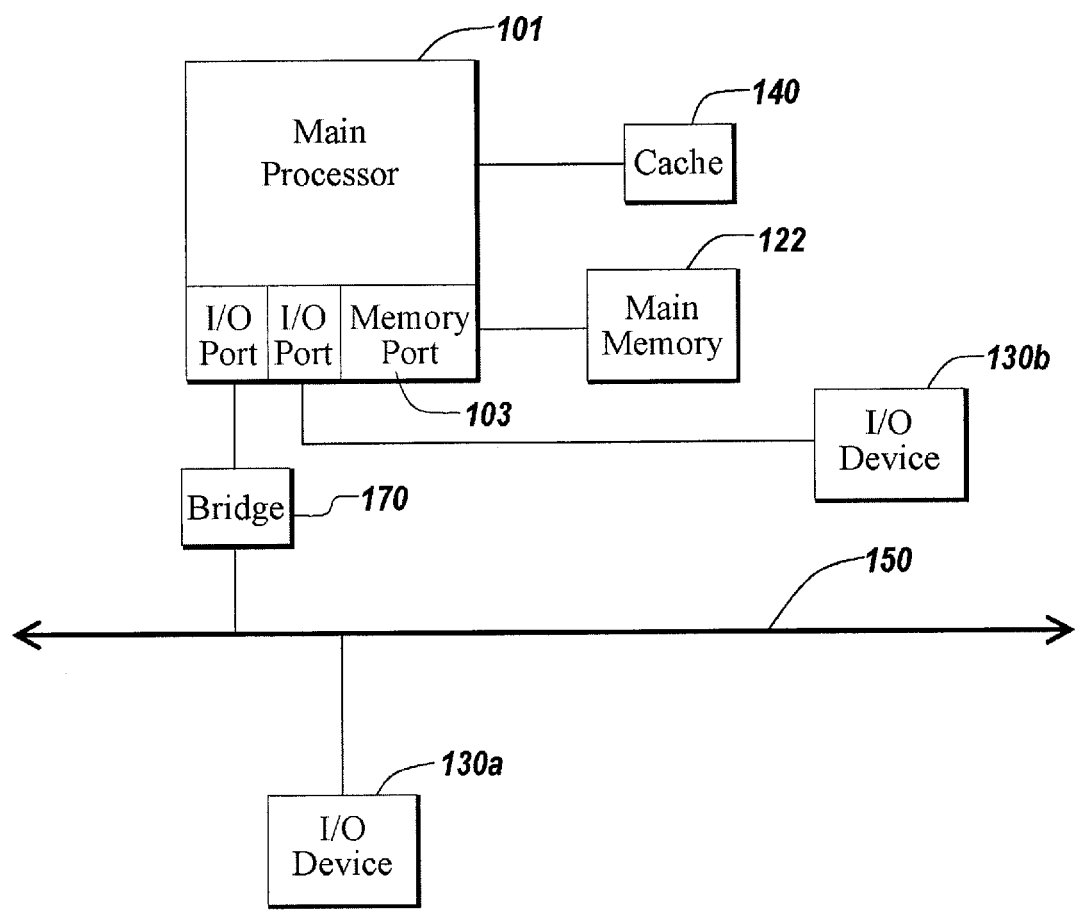

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
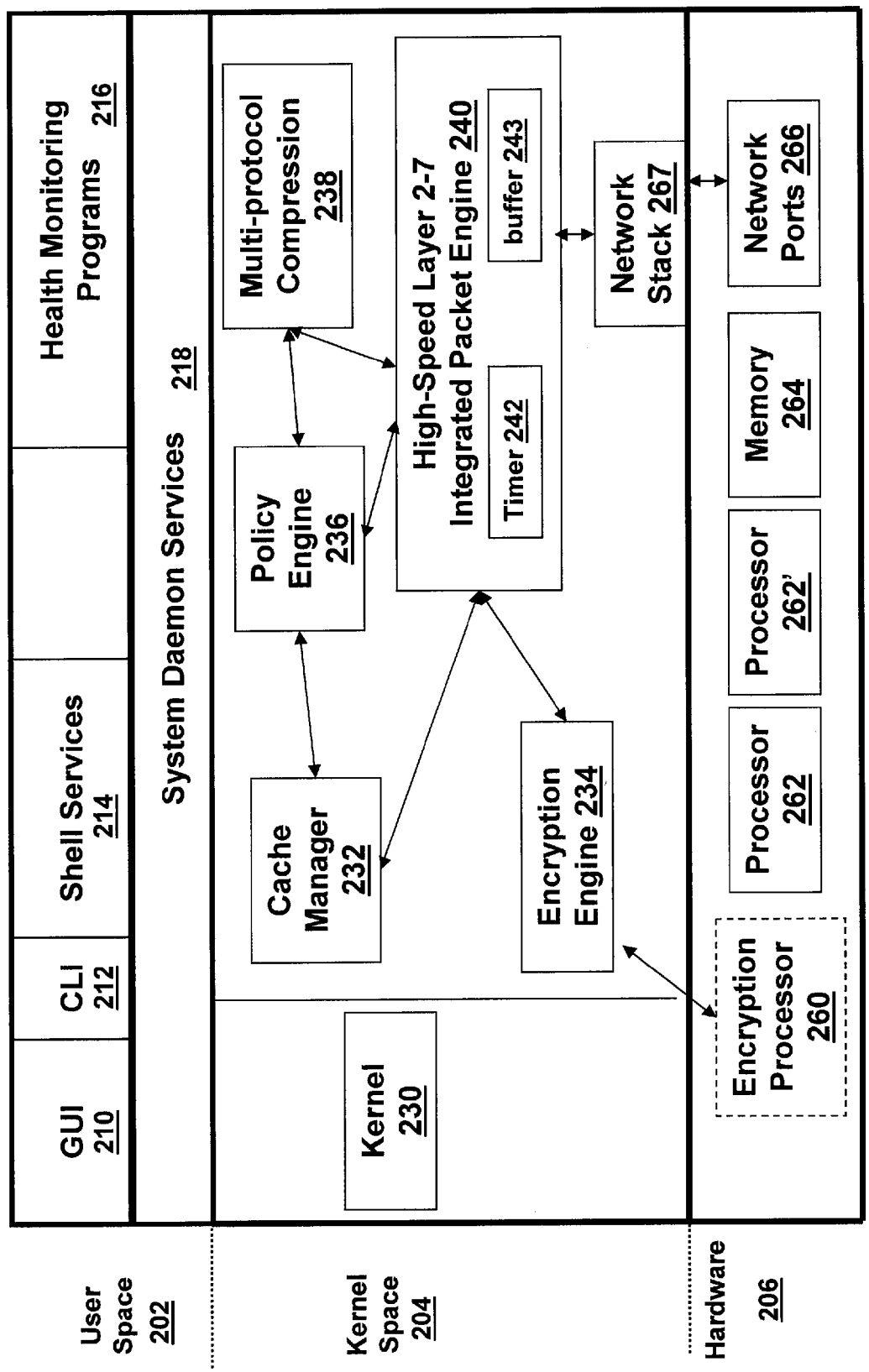
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
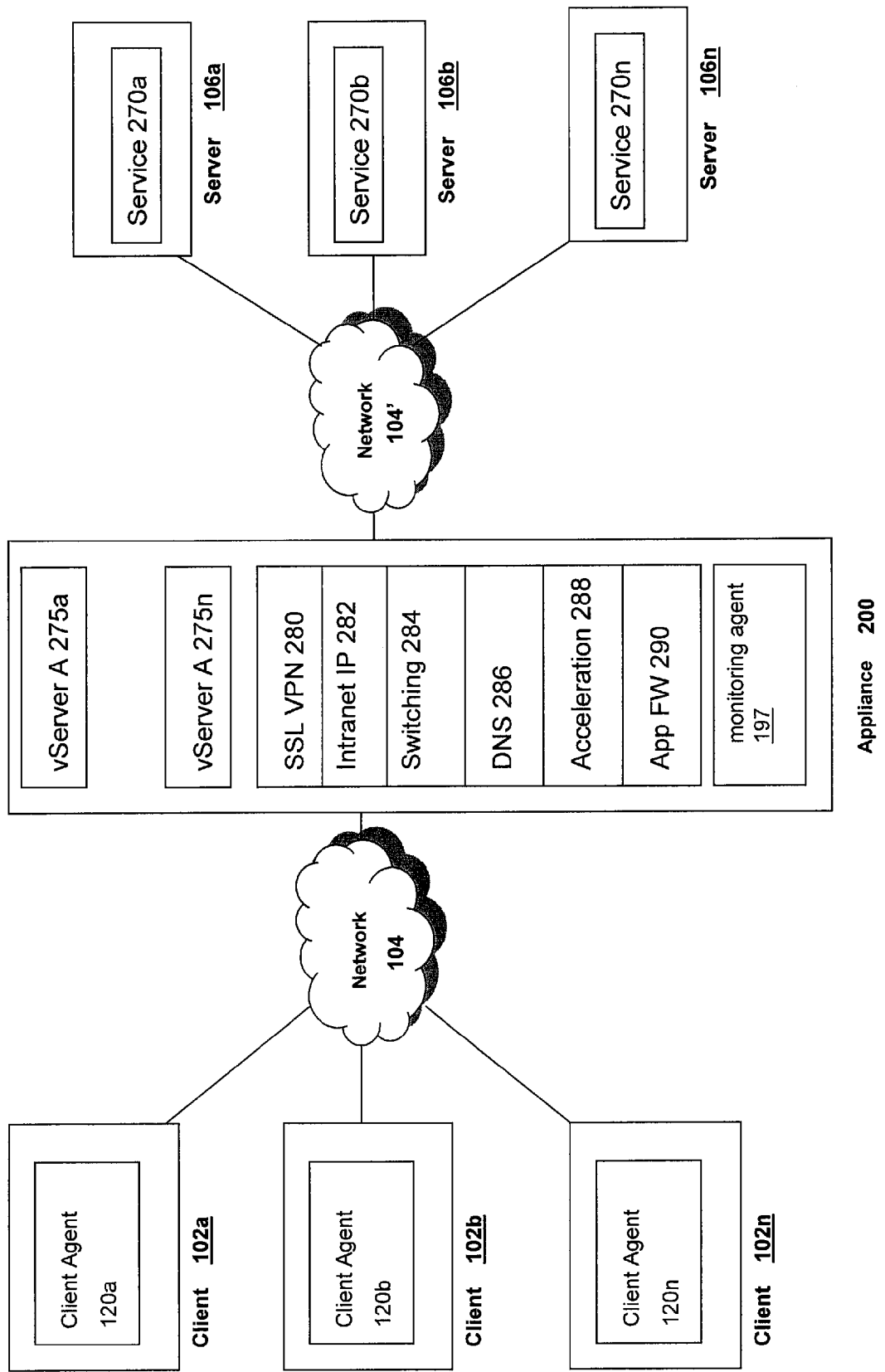
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
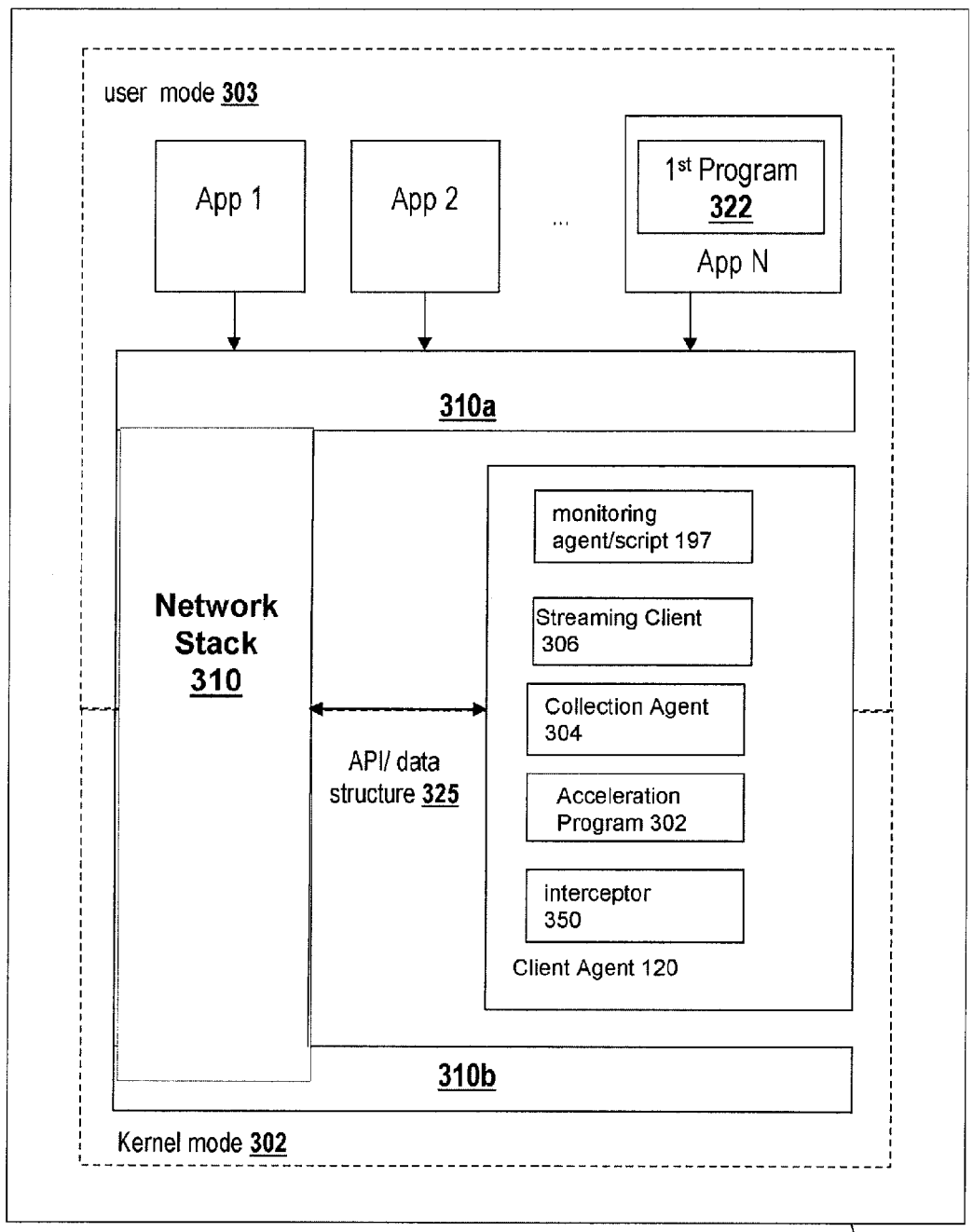
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Program Neighborhood and Access to Remote Access Server Farm

Figure 4A:
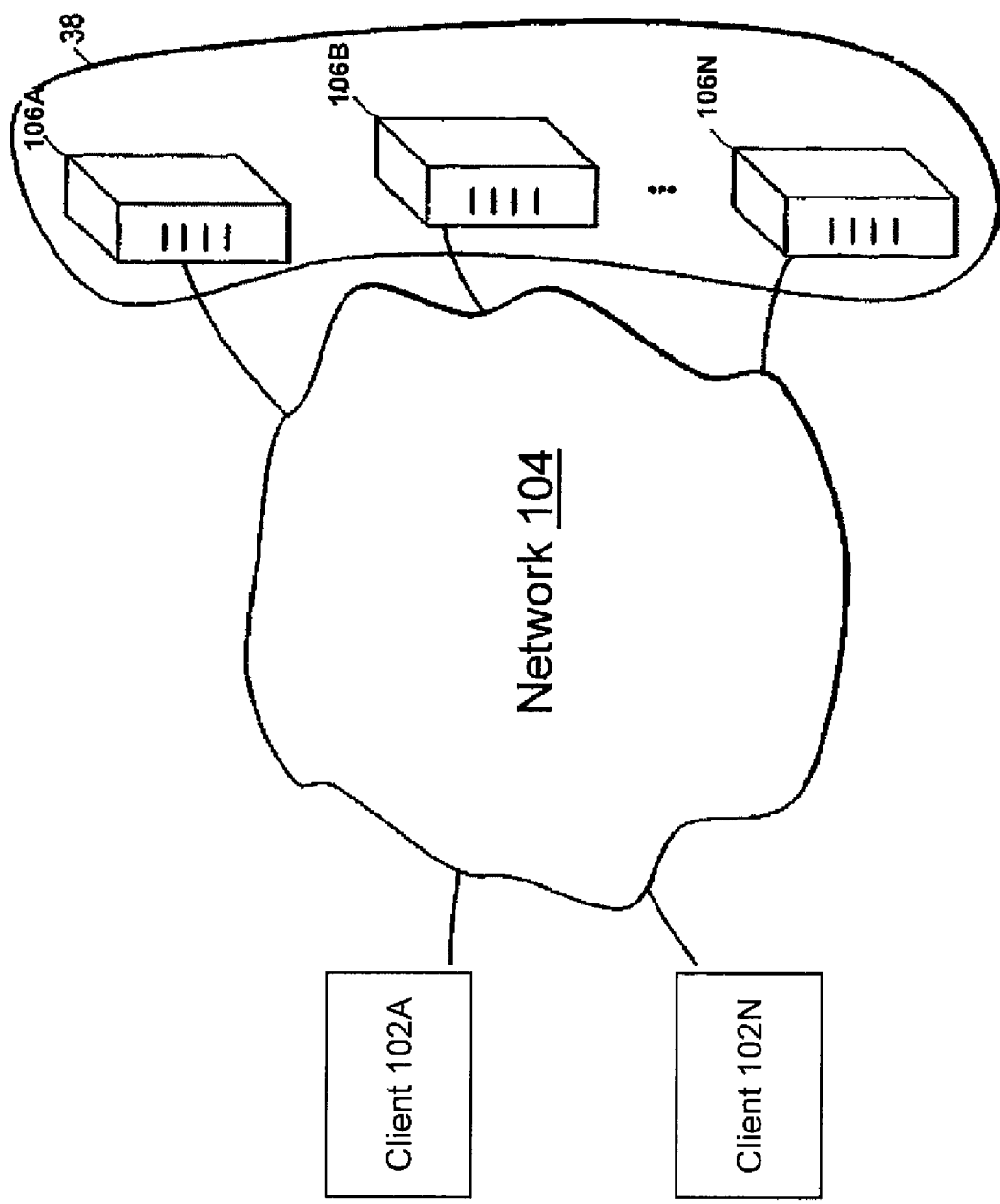
FIG. 4A is a block diagram of an embodiment of client nodes in communication with a group of server nodes via a network.

FIG. 4A shows a first computing system (client node) 102A and a second computing system (client node) 102N in communication with computing systems (application servers) 106A, 106B, and 106N over a network 104. The connections may be established using a variety of communication protocols (e.g., TCP/IP, IPX, SPX, NetBIOS, Ethernet, RS232, and direct asynchronous connections) over any type and form of network 104.

The client node 102A may be any type and form of computer or computing device (e.g., 286, 386, 486, Pentium, Pentium II, Macintosh computer), Windows-based terminal, Network Computer, wireless device, information appliance, RISC Power PC, X-device, workstation, mini computer, main frame computer or other computing device that has a windows-based desktop and sufficient persistent storage for executing application programs downloaded from the application servers 106A, 106B, and 106N across the network 104. Windows-oriented platforms supported by the client node 102A may include Windows 3.x, Windows 95, Windows 98, Windows NT 3.51, Windows NT 4.0, Windows CE, Macintosh, Java, and UNIX. The client node 102A may include a display screen, a keyboard, memory for storing downloaded application programs, a processor, and a mouse. The memory may provide persistent or volatile storage. The processor may execute the application programs locally on the client node 102A and display a resulting windows-based desktop on the display screen. Such local processing on the client node 102A is according to the above-described client-based computing model.

In other embodiments, the client node 102 may be any terminal (windows or non-windows based), or thin-client device operating according to a server-based computing model. In a server-based computing model, the execution of application programs occurs entirely on the application servers 106A, 106B, and 106N, and the user interface, keystrokes, and mouse movements are transmitted over the network 104 to the client node 102N. The user interface may be text driven (e.g., DOS) or graphically driven (e.g., Windows). Platforms that can be supported by the client node 102 include DOS and Windows CE for windows-based terminals.

The application servers 106A, 106B, and 106N may be any computing device that controls access to portions of the network (e.g., workstations, printers). It is to be understood that more or fewer application servers may be connected to the network 104. The servers 106A, 106B, and 106N may operate according to either a client-based computing model or a server-based computing model.

Each application server 106A, 106B, and 106N hosts one or more application programs that are accessed by the client nodes 102A and 102N. Applications made available to client nodes for use are referred to as published applications. Examples of such applications include word processing programs such as MICROSOFT WORD® and spreadsheet programs such as MICROSOFT EXCEL®, both manufactured by Microsoft Corporation of Redmond, Wash., financial reporting programs, customer registration programs, programs providing technical support information, customer database applications, or application set managers.

The servers 106A, 106B, and 106N may belong to the same domain or the same server farm 38. In the network 10, a domain is a sub-network comprising a group of application servers and client nodes under control of one security database. A domain may include one or more "server farms." A server farm is a group of servers that are linked together to act as a single server system to provide centralized administration. Conversely, a server farm may include one or more domains. For servers of two different domains to belong to the same server farm, a trust relationship may need to exist between the domains. A trust relationship is an association between the different domains that allows a user to access the resources associated with each domain with just one log-on authentication.

In one embodiment, the application server 106 is in a different domain than the domain 38. In another embodiment, the application server 106 is in the same domain as servers 106A, 106B, and 106N. For either embodiment, application servers 106A, 106B, and 106N may belong to one server farm, while the server 106 belongs to another server farm, or all of the application servers 106A, 106B, and 106N may belong to the same server farm. When a new server is connected to the network 104, the new server joins either an existing server farm or starts a new server farm.

The network 104 may include a master server node for performing load-level balancing among the application servers 106A, 106B, and 106N. The master server node can be one of the application servers 106A, 106B, or 106N. The master server node includes a list of server addresses and load information corresponding to each of the other application servers. The master server node may direct the client node to a particular server node on which to execute an application based on the list of available servers and corresponding load levels. In other embodiments, the application servers 106A, 106B, and 106N, may collaborate among themselves in a peer-to-peer fashion in order to exchange administration information such as load levels, allowing any server 106A, 106B, or 106N to respond to a request made by a client node 102.

Program Neighborhood

The user of either client node 102A and 102N is able to learn of the availability of application programs hosted by the application servers 106A, 106B, and 106N, such as published applications, in the network 104 without requiring the user to know where to find such applications or to enter technical information necessary to link to such applications. These available application programs comprise the "program neighborhood" of the user. A system for determining a program neighborhood for a client node includes an application program (hereafter referred to as the "Program Neighborhood" application), memory for storing components of the application program, and a processor for executing the application program.

The Program Neighborhood application may be installed in memory of the client node 102A and/or on the application servers 106A, 106B and 106N as described below. The Program Neighborhood application is a collection of one or more services, applications program interfaces (APIs), and user interface (UI) programs that disclose to users of the client nodes 102A, 102N those application programs hosted by the application servers that each client node is authorized to use (e.g., execute).

An application server operating according to the Program Neighborhood application collects application-related information from each of the application servers in a server farm. The application-related information for each hosted application may be a variety of information including, for example, an address of the server hosting that application, the application name, the users or groups of users who are authorized to use that application, and the minimum capabilities required of the client node before establishing a connection to run the application. For example, the application may stream video data, and therefore a required minimum capability is that the client node supports video data. Other examples are that the client node can support audio data or can process encrypted data. The application-related information may be stored in a database as described later in the specification.

When a client node logs onto the network 104, the user of the client node provides user credentials. User credentials typically include the username of the client node, the password of the user, and the domain name for which the user is authorized. The user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client node can be obtained and submitted for authentication. The server responding to the client node can authenticate the user based on the user credentials. The user credentials can be stored wherever the Program Neighborhood application is executing. When the client node 102A executes Program Neighborhood application, the user credentials may be stored at the client node 102A. When an application server is executing the Program Neighborhood, the user credentials may be stored at that server. From the user credentials and the application-related information, the server may determine which application programs hosted by the application servers are available for use by the user of the client node. The server transmits information representing the available application programs to the client node. This process eliminates the need for a user of the client node to set-up application connections. Also, an administrator of the server can control access to applications among the various client node users.

The user authentication performed by the server may suffice to authorize the use of each hosted application program presented to the client node, although such applications may reside at another server. Accordingly, when the client node launches (i.e., initiates execution of) one of the hosted applications, additional input of user credentials by the user may be unnecessary to authenticate use of that application. Thus, a single entry of the user credentials may serve to determine the available applications and to authorize the launching of such applications without an additional, manual log-on authentication process by the client user.

Either a client node 102A, 102N or an application server may launch the Program Neighborhood application. The results are displayed on the display screen of the client node 102A, 102N. In a graphical windows-based implementation, the results may be displayed in a Program Neighborhood graphical window and each authorized application program may be represented by a graphical icon in that window. One embodiment of the Program Neighborhood application filters out application programs that the client node 102A, 102N is unauthorized to use and displays only authorized (i.e., available) programs. In other embodiments, the Program Neighborhood application displays authorized and unauthorized applications. When unauthorized are not filtered from the display, a notice may be provided indicating that such applications are unavailable. In other embodiments, the Program Neighborhood application may report all applications hosted by the application servers 106A, 106B, and 106N to the user of a client node, without identifying which applications the client node 102A, 102N is authorized or unauthorized to execute. Authorization may be subsequently determined when the client node 102A, 102N attempts to run one of those applications.

FIG. 2A shows an exemplary process by which a server launches the Program Neighborhood (PN) application and presents results of the PN application to the client node 102A. The server may launch the PN application in response to a request 442 by the client node 102A for a particular application program. The request passes to the master server node, in this example server 106A. The master server node 106A, taking load-balancing and application availability into account, indicates (arrow 443) to the client node 102A that the sought-after application is available on server 106B. The client node 102A and server 106B establish a connection (arrows 445 and 446). By this connection, the server 106B may transfer the executable code of the particular application to the client node 102A, when the client node 102A and server 106B are operating according to the client-based computing model. In other embodiments, the server 106B may execute the particular application and transfer the graphical user interface to the client node 102A, when the client node 102A and server 106N are operating according to the server-based computing model. In addition, either the master server node 106A or the server 106B can execute the Program Neighborhood application 41 and push the results (arrows 443 or 446) back to the client node 102A so that when the client node 102A requests the Program Neighborhood application, the program neighborhood is already available at the client node 102A.

FIG. 4C shows another exemplary process by which the client node 102N initiates execution the Program Neighborhood application and a server presents the results of the PN application to the client node 102N. The client node 102N launches the Program Neighborhood application (e.g., by clicking on the Program Neighborhood icon 447 representing the application). The request 540 for the Program Neighborhood application is directed to the master server node, in this example server 106A. The master server node 106A may execute the Program Neighborhood application, if the application is on the master server node 106N, and return the results to the client node 102N. In other embodiments, the master server node 106A may indicate (arrow 451) to the client node 102N that the Program Neighborhood application 441 is available on another server, in this example server 106B. The client node 102N and server 106N establish a connection (arrows 453 and 454) by which the client node 102A requests execution of the Program Neighborhood application 41. The server 106B may execute the application 441 and transfer the results (i.e., the graphical user interface) to the client node 102A.

Figure 4D:
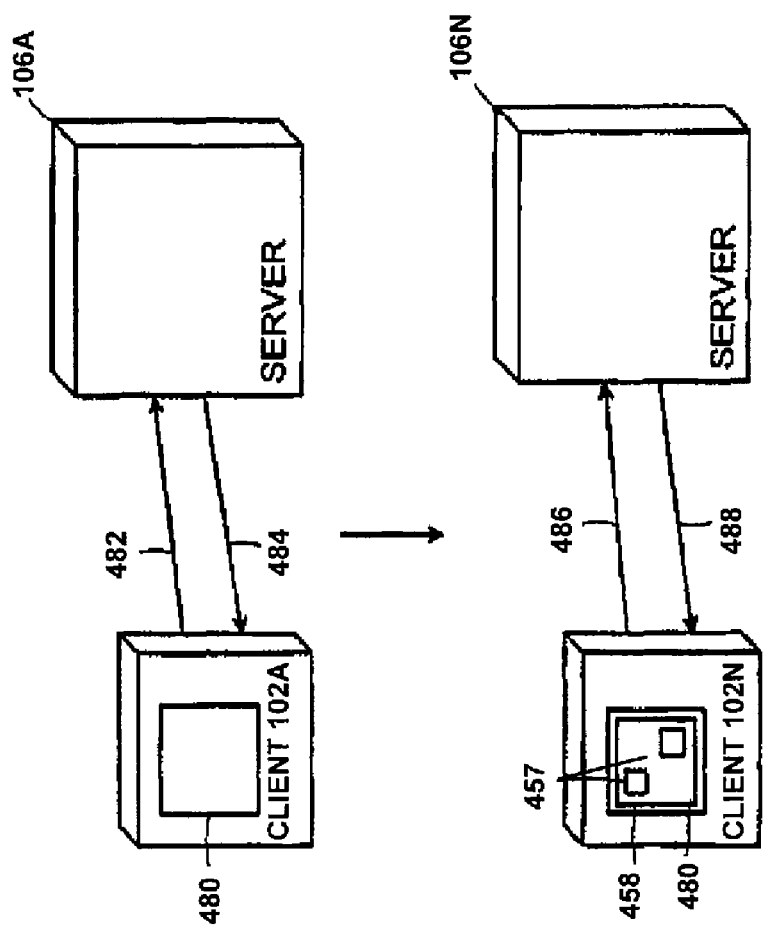
FIG. 4D is a block diagram illustrating an embodiment of a process by which a client node uses a web browser application to determine its program neighborhood.

FIG. 4D shows another exemplary process by which a client node 102A initiates execution of the Program Neighborhood application, in this example via the World Wide Web. A client node 102N executes a web browser application 480, such as NETSCAPE NAVIGATOR, manufactured by Netscape Communications, Inc. of Mountain View, Calif. or MICROSOFT INTERNET EXPLORER, manufactured by Microsoft Corporation of Redmond, Wash.

The client node 102N, via the web browser 480, transmits a request 482 to access a Uniform Resource Locator (URL) address corresponding to an HTML page residing on server 106N. In some embodiments the first HTML page returned 484 to the client node 102N by the server 106N is an authentication page that seeks to identify the client node 102N. The authentication page allows the client node 102N to transmit user credentials, via the web browser 480, to the server 106N for authentication. Transmitted user credentials are verified either by the server 106N or by another server in the farm. This allows a security domain to be projected onto the server 106N. For example, if the server 106N runs the WINDOWS NT operating system, manufactured by Microsoft Corporation of Redmond, Wash., and the authenticating server runs the UNIX operating system, the UNIX security domain may be said to have been projected onto the server 106N. User credentials may be transmitted "in the clear," or they may be encrypted. For example, user credentials may be transmitted via a Secure Socket Layer (SSL) connection, which encrypts data using the RC3 algorithm, manufactured by RSA Data Security, Inc. of San Mateo, Calif.

The server 106N may verify the user credentials received from the client node 102N. Alternatively, the server 106N may pass the user credentials to another server for authentication. In this embodiment, the authenticating server may be in a different domain from the server 106N. Authenticated user credentials of the client node 102N may be stored at the client node 102N in a per-session cookie, in fields that are not displayed by the web browser 480, or in any other manner common in maintenance of web pages. In some embodiments, a server farm with which the server 102N is associated may allow guest users, i.e., users that do not have assigned user credentials, to access applications hosted by servers in the farm. In these embodiments, the authentication page may provide a mechanism for allowing a client node 102N to identify that it is a guest user, such as a button or menu selection. In other of these embodiments, the server 106N may omit the authentication page entirely.

Still referring to FIG. 4D, once the client node 102N is authenticated by the server 106N, the server prepares and transmits to the client node 102N an HTML page 488 that includes a Program Neighborhood window 458 in which appears graphical icons 457, 457' representing application programs to which the client node 102N has access. A user of client node 102N invokes execution of an application represented by icon 457 by clicking that icon 457.

Figure 4E:
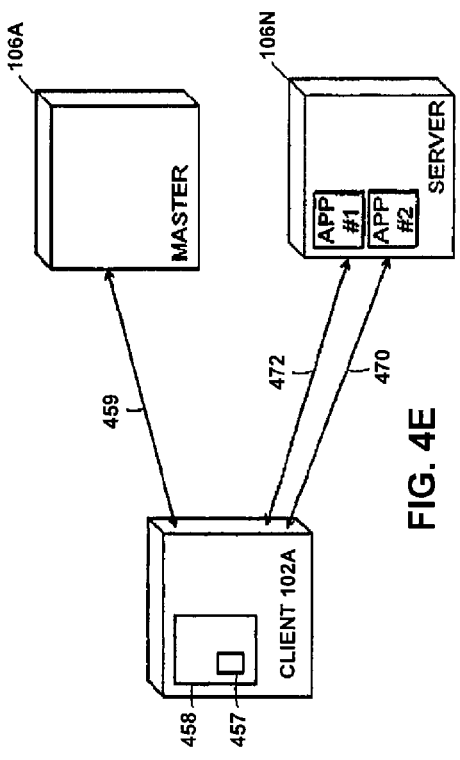
FIGS. 4E, 4F and 4G are block diagrams illustrating an embodiment of a process by which a client node may launch an application program from a Program Neighborhood window displayed at that client node.

FIG. 4E shows an exemplary process of communication among the client node 102A, the master server node, in this example server 106A, and the server 106N. The client node 102A has an active connection 472 with the server 106N. The client node 102A and server 106N may use the active connection 472 to exchange information regarding the execution of a first application program. The user credentials of the client node 102A are stored at the client node. Such storage of the user credentials may be in cache memory or persistent storage.

In this embodiment, the Program Neighborhood application runs on the client node 102A. The client node display has a Program Neighborhood window 458 in which appears a graphical icon 457 representing a second application program. A user of the client node 102A may launch the second application program by double-clicking the icon 457 with the mouse. The request passes to the master server node 106A via a connection 459. The master server node 106A indicates to the client node 102A via the connection 459 that the sought-after application is available on server 106N. The client node 102A signals the server 106N to establish a second connection 470. The server 106N requests the user credentials from the client node 102A to authenticate access to the second application program. Upon a successful authentication, the client node 102A and server 106N establish the second connection 470 and exchange information regarding the execution of the second application program. Accordingly, the client node 102A and the server 106N communicate with each other over multiple connections.

Figure 4F:
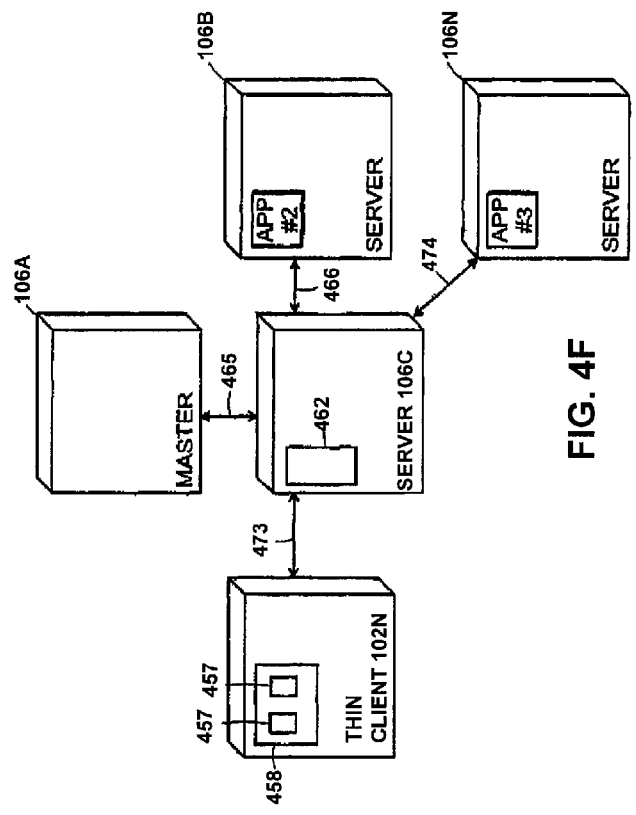

FIG. 4F shows an exemplary process of communication among the client node 102N, the master server node, in this example server 106A, and servers 106B, and 106N. The client node 102N has an active connection 473 with the server 106B. The client node 102N and server 106N may use the active connection 473 to exchange information regarding the execution of a first application program. The user credentials of the client node 102N are stored at the server 106B in cache memory or in persistent storage. In this embodiment, the Program Neighborhood application runs on the server 106B. The server 106B includes software providing a server-based client engine 462, enabling the server 106B to operate in the capacity of the client node 102N. The client node 102N display has a Program Neighborhood window 458 in which appears graphical icons 457, 457' representing a second application program and a third application program, respectively. A user of the client node 102N may launch the second application program by double-clicking the icon 457. The request to launch the second application program passes to the server 106B via active connection 473, and the server 106B forwards the request to the master server node 106C (arrow 465).

The master server node 106A indicates (arrow 465) to the server 106C that the sought-after application is available on server 106B. The server 106C contacts the server 106B to establish a connection 466. To authenticate access to the application, the server 106B obtains the user credentials of the client node 102N from the server 106C. The server 106C and server 106B establish the connection (arrow 466) by which the server 106C requests execution of the second application and the server 106B returns the graphical user interface results to the server 106C. The server 106C forwards the graphical user interface results to the client node 102A, where the results are displayed. Accordingly, the information exchanged between the client node 102A and the server 106B "passes through" the server 106C. Similarly, the client node 102A may launch the third application program by double-clicking the icon 457'. The request to launch the third application program passes to the server 106C. The server 106C forwards the request to the master server node 106A, which considers load-balancing and application program availability to determine which server can handle the request. In this example, the master server node indicates that server 106N may run the third application program.

The server 106C and server 106N establish a connection (arrow 474) by which the server 106C requests execution of the third application program, and the server 106N returns the graphical user interface results to the server 106C. To permit execution of the third application program, the server 106N may authenticate the user credentials of the client node 102N which are obtained from the server 106C. The server 106C forwards the graphical user interface results to the client node 102N where the results are displayed. Accordingly, the results of executing the third application program pass between the client node 102N and the server 106N through the server 106C.

From this illustration it should be understood that client node 102N may run multiple application programs through one connection with the server 106C, while the server 106C maintains multiple connections (in this example, one connection with server 106B and a second connection with server 106N). Also, the server 106C merges the information received from the server 106B with the information received from the server 106N into one data stream for transmission to the client node 102A.

Figure 4G:
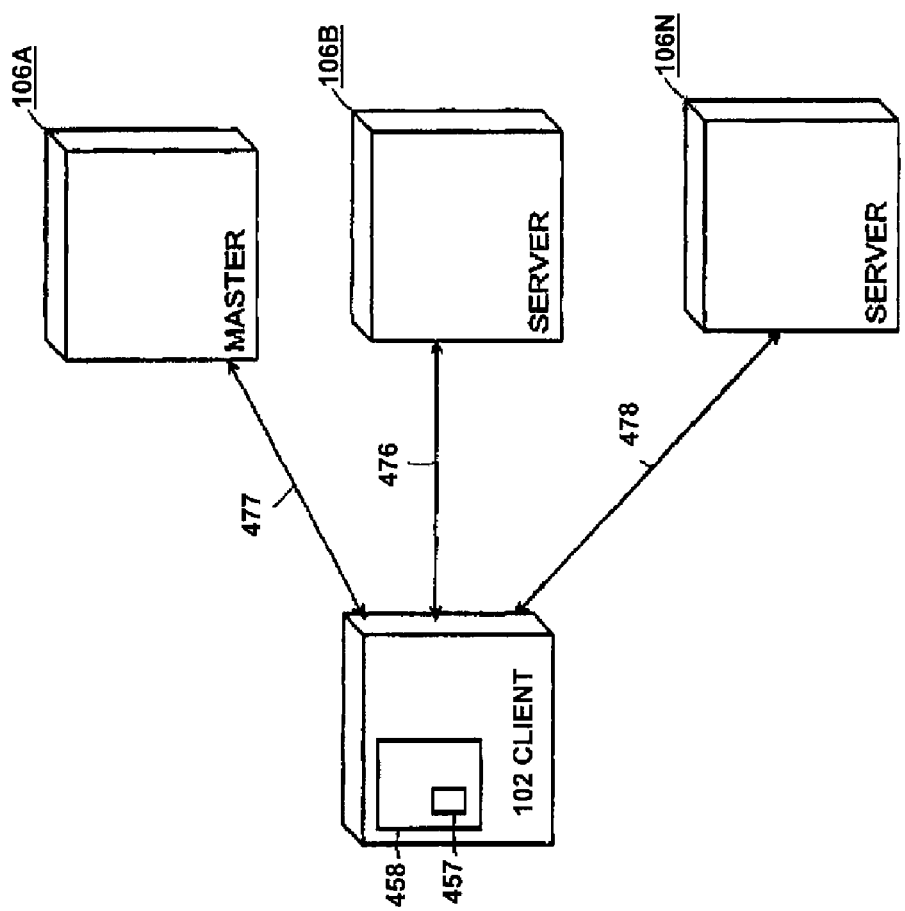

FIG. 4G shows an exemplary process of communication among the client node 102, the master server node, in this example server 106A, and servers 106B and 106N. The client node 102 has an active connection 476 with the server 106B. The client node 102 and server 106B may use the active connection 476 to exchange information regarding the execution of a first application program. The client node 102 may store the user credentials in cache memory or in persistent storage.

In this embodiment, the Program Neighborhood application runs on the server 106B. The client node 102 display has a Program Neighborhood window 458 in which appears a graphical icon 457 representing a second application program. A user of the client node 102 may launch the second application program by double-clicking the icon 457. The request to launch the second application program passes to the server 106B. The server 106B responds (i.e., "calls back") to the client node 102 by returning application-related information such as the name of the application and capabilities needed by the client node 102 for the second application to run.

With the information provided by the server 106B, the client node 102 then communicates with the master server node 106A via connection 477 to determine the server for executing the second application program. In this example, that server is server 106N. The client node 102 then establishes a connection 478 to the server 106N. Server 106N requests the user credentials from the client node 102 to authenticate the user of the client node 102. The second application program executes on the server 106N, and the server 106N returns the graphical user interface to the client node 102 via the established connection 478. Accordingly, the client node 102 may have multiple active connections between the multiple servers.

Figure 4H:
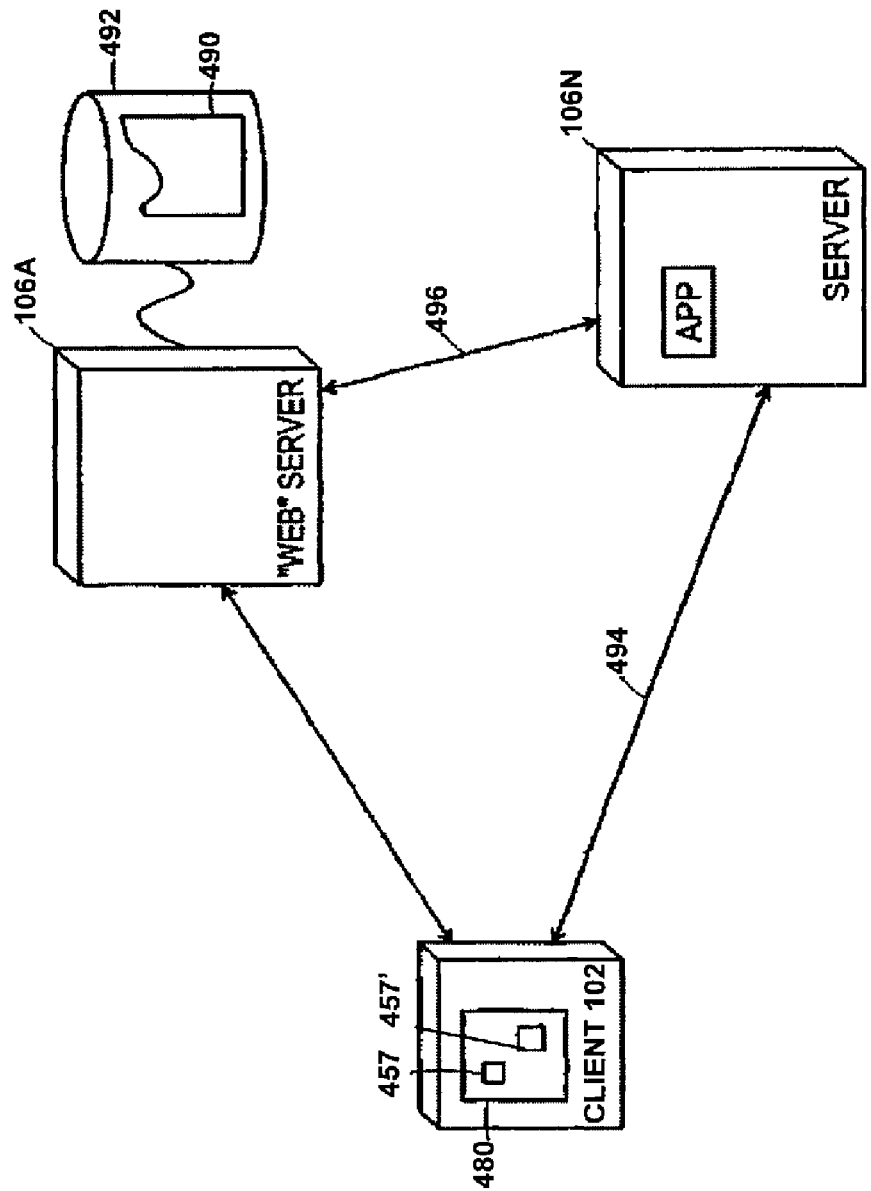
FIG. 4H is a block diagram illustrating an embodiment of a process by which a client node may launch an application program from a Program Neighborhood web page displayed at that client node.

FIG. 4H shows an exemplary process of communicating between the client node 102, a server 106A that in this example acts as a web server, and server 106N. The client node 102 authenticates itself to the server 106A as described above in connection with FIG. 2C. In one embodiment, the server 106A accesses an output display template 490, such as an SGML, HTML or XML file, to use as a base for constructing the Program Neighborhood window to transmit to the client node 102. The template may be stored in volatile or persistent memory associated with the server 106A or it may be stored in mass memory, such as a disk drive or optical device. In this embodiment, the template 490 is a standard SGML, HTML, or XML document containing Program Neighborhood-specific tags that are replaced with dynamic information. The tags indicate to the server 106A where in the output display to insert information corresponding to available applications, such as icon images. In one embodiment, the Program Neighborhood-specific tags are embedded within comments inside the file, allowing the file to remain compatible with standard interpreters. In another embodiment, the Program Neighborhood-specific tags are extensions of the markup language used as the base for the template.

Examples of HTML tags that may be used in a template are set forth below in Table 1:

TABLE 1

| Tag | Description |
| --- | --- |
| ControlField__/zeW value | This tag is used to set the value of data that either persists between Program Neighborhood web pages, are set by the user, or are used to help in cross page navigation, such as user name domain password template and application |
| DrawProgramNeighborhood | His tag is used to draw a Program Neighborhood display at this location in an output display |
| AppName | This tag is replaced by the name of the published application in the current context. |
| WindowType | This tag is replaced by the window type of the published application in the current context. |

TABLE 1-continued

| Tag | Description |
| --- | --- |
| WindowHeight | This tag is replaced by the window height of the published application in the current context. |
| WindowWidth | This tag is replaced by the window width of the published application in the current context. |
| WindowScale | This tag is replaced by the window scale of the published application in the current context. |
| WindowColors | This tag is replaced by the color depth of the published application in the current context. |
| SoundType | This tag is replaced by the sound setting of the published application in the current context. |
| VideoType | This tag is replaced by the video setting of the published application in the current context. |
| EncryptionLevel | This tag is replaced by the encryption level of the published application in the current context. |
| Icon | This tag is replaced by the icon of the published application in the current context. |

Other tags may be provided to set control fields and to provide conditional processing relating to the Program Neighborhood application.

In one embodiment, the template is constructed dynamically using, for example, COLD FUSION, manufactured by Allaire Corp. of Cambridge, Mass. or ACTIVE SERVER PAGES manufactured by Microsoft Corporation of Redmond, Wash. In other embodiments, the template may be static. The Program neighborhood application parses the template, replacing Program Neighborhood-specific tags as noted above. Tags that are not Program Neighborhood-specific are left in the file to be parsed by the browser program 480 executing on the client 102.

In one embodiment, a template parser object is provided that accepts an HTML template as input, interprets Program Neighborhood-specific tags present in the template, and output the original template with all Program Neighborhood tags replaced with appropriate text. The template parser object may be passed a cookie, a URL query string, or a control field from a web server interface to provide the information with which Program Neighborhood-specific tags should be replaced.

In another embodiment, the Program Neighborhood application allows scripts to access to information via an application programming interface. Scripts may be written in, for example, VBScript or Jscript. In this embodiment, the scripting language is used to dynamically generate an output display using information returned by the application in response to queries posed by the script. Once the output display is generated, it is transmitted to client node 102 for display by the browser program 480.

Figure 4I:
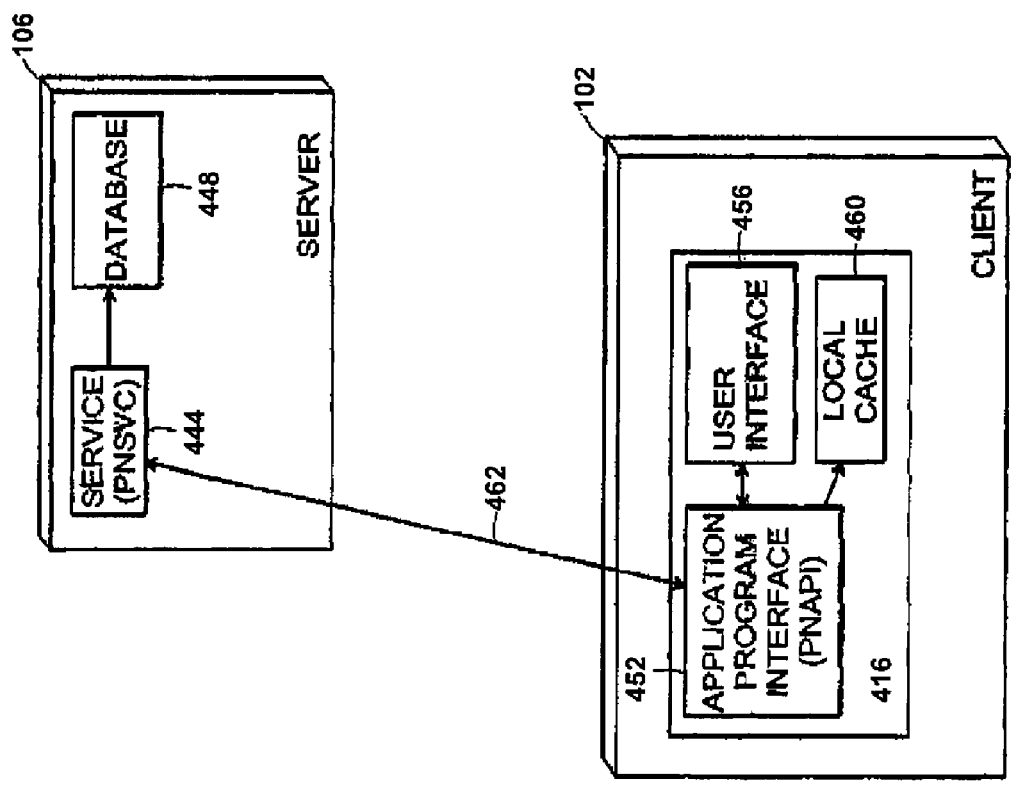
FIG. 4I is a block diagram of an embodiment of program components for a Program Neighborhood application.

A user of the client node 102 can launch an application by double-clicking with a mouse an icon 457, 457' displayed in the Program Neighborhood web page. In some embodiments, each icon 457, 457' is an encoded URL that specifies: the location of the application (i.e., on which servers it is hosted or, alternatively, the address of a master server); a launch command associated with the application; and a template identifying how the output of the application should be displayed (i.e., in a window "embedded" in the browser or in a separate window). In some embodiments, the URL includes a file, or a reference to a file, that contains the information necessary for the client to create a connection to the server hosting the application. This file may be created by the Program Neighborhood application dynamically. The client node 102 establishes a connection (arrow 494) with the server identified as hosting the requested application (in this example, server 106N) and exchanges information regarding execution of the desired application. In some embodiments, the connection 494 is made using the Independent Computing Architecture (ICA) protocol, manufactured by Citrix Systems, Inc. of Fort Lauderdale, Fla. Thus, the client node 102 may display application output in a window separate from the web browser 460, or it may "embed" application output within the web browser. FIG. 4I illustrates an example arrangement of program components for a client-based implementation of the Program Neighborhood application. A client-based implementation of Program Neighborhood application may be used in a network using either the server-based computing model in which the servers execute the Program Neighborhood application or the client-based computing model in which the client node 102A executes the Program Neighborhood application locally. The Program Neighborhood application includes a Program Neighborhood Service (PNSVC) component 444, an Application Database component 448, a Program Neighborhood Application Program Interface (PNAPI) component 452, a Program Neighborhood User Interface component 456, and a local cache 460. The application server 106A, for example, includes the service component (PNSVC) 444 and the application database 448. The client node 102A, which is a representative example of a client node that may support a client-based implementation of the Program Neighborhood application, includes the application program interface PNAPI 452, the user interface component 456, and the local cache 460 components. The PNAPI 452 communicates with the user interface component 456 and the local cache 460. The PNSVC 444 communicates with the application database 448 and with the PNAPI 452 on the client node 102A via communications link 462.

The communications link 462 may be established by, for example, using the ICA protocol. ICA is a general-purpose presentation services protocol designed to run over industry standard network protocols, such as TCP/IP, IPX/SPX, NetBEUI, using industry-standard transport protocols, such as ISDN, frame relay, and asynchronous transfer mode (ATM). The ICA protocol provides for virtual channels, which are session-oriented transmission connections that may be used by application-layer code to issue commands for exchanging data. The virtual channel commands are designed to be closely integrated with the functions of client nodes. One type of virtual channel connection supported by the ICA protocol is a Program Neighborhood virtual channel. The Program Neighborhood virtual channel protocol may include four groups of commands:
(1) initialization-related commands;
(2) single authentication related commands that can be supported by each client node wanting a copy of the user credentials;
(3) application data related commands for implementing the Program Neighborhood user interface; and
(4) application launch callback-related commands for running the user interface on an application server.

Application Database

The application database 448 is a cache of the authorized user and group information for all the public (i.e., published) applications in a server farm or in a group of trusted domains. Each server in a server farm may maintain its own application-related information in persistent storage and build up the database 448 in volatile storage. In another embodiment, all collected application-related information in the database 448 are stored in persistent storage and made accessible to each other server in the server farm.

The database 48 may be implemented in a proprietary format (e.g., as a linked list in memory) or using Novell's Directory Services (NDS) or any directory service adhering to the X.500 standard defined by the International Telecommunication Union (ITU) for distributed electronic directories. The application database 448 includes a list of application servers. Each server in the list has an associated set of applications. Associated with each application is application-related information that can include the application name, a list of servers, and client users that are authorized to use that application. An overly-simplified example of the application-related information maintained in the database is illustrated by the following

TABLE 2

| Server Name | Applications | | | |
| --- | --- | --- | --- | --- |
| | Spreadsheet | Customer Database | Word Processor | Calculator |
| Server 106A | User A | UserB | n/a | — |
| Server 106B | UserB | n/a | User A | — |
| Server 106N | | | | User A UserB |

Users A and B are users of the client nodes 102A, 102N, "n/a" indicates that the application is hosted, but is not available to client node users, and "-" indicates that the application is not hosted.

Table 2 shows a list of servers 106A, 106B, 106N, the applications hosted by the servers, (Spreadsheet, Customer Database, Word Processor, and Calculator), and those users who are authorized to use the applications. For example, server 106A hosts the Spreadsheet program, the Customer Database and the Word Processor. User A is authorized to use the Spreadsheet, User B is authorized to use the Customer Database, and no users are authorized to use the Word Processor. It is to be understood that other techniques can be used to indicate who is authorized to use a particular application. For example, the user information stored in the database can be used to indicate those users who are unauthorized to use a particular application rather than those who are authorized.

To obtain the information that is stored in the database 448, the server 106A obtains the application-related information from each other server in the server farm regarding the applications on those servers, including control information that indicates which client users and servers are permitted to access each particular application. The application-related information maintained in the database may or may not persist across re-boots of the server 106A.

The application database 448 can be a central database that is stored at the application servers 106A and is accessible to all of the servers in the server farm. Accordingly, the application-related information can be available for use by other servers such as those servers that perform published application authentication during session log-on and application launching. In another embodiment, the application database 448 is maintained at each of the application servers based upon the information that each server obtains from communications with each other server in the server farm.

Program Neighborhood Service Program (PNSVC)

Each server 106A, 106B, and 106N having the Program Neighborhood application installed thereon executes the PNSVC software 444. The PNSVC software 444, operating on each server 106A, 106B, and 106N establishes a communication link (e.g., a named pipe) with each other server. The servers 106A, 106N, and 106N exchange the application-related information on the named pipes. In another embodiment, the PNSVC software 444 collects the application-related information from the other servers in the server farm through remote registry calls (e.g., the service component 444 transmits a datagram to other servers in the plurality requesting the application-related information corresponding to the application programs hosted by those servers). The PNSVC 444 software also maintains the relationships of groups and users to published applications in the application database 448 and accesses the information when authenticating a client user. An administrator of the server 106A may use a user interface to configure the PNSVC 444.

Other functions of the PNSVC software 444 include implementing the services and functions requested by the PNAPI 452 and communicating with the PNAPI 452 on the client node 102A using a Program Neighborhood virtual device driver (VDPN). The VDPN operates according to the Program Neighborhood virtual channel protocol described above for establishing and maintaining an ICA connection.

Program Neighborhood Application Program Interface (PNAPI)

The PNAPI 452 is a set of software functions or services that are used by the Program Neighborhood application to perform various operations (e.g., open windows on a display screen, open files, and display message boxes). The PNAPI 452 provides a generic mechanism for launching application objects (e.g., icons) produced by running the Program Neighborhood application and application objects in a legacy (i.e., predecessor or existing for some time) client user interface. When the client node 102A launches an available application, the launch mechanism may launch the application on the server 106A, if necessary (e.g., when the client node 102A does not have the resources to locally execute the application).

The PNAPI 542 provides all published application information to the user interface component 456 for display on the screen of the client node 102A. The PNAPI 452 also manages server farm log-ons in a local database of logon credentials (e.g., passwords) for users of the client node 102A to support the single authentication feature. Credentials may or may not be persistent across bootings (power-off and on cycles) of the client node 102A.

The PNAPI 452 provides automatic and manual management for Program Neighborhood application objects stored in the local cache 460. The local cache 460 may be refreshed manually by the user of the client node 102A, or at a user-definable refresh rate, or by the server at any time during a connection. In a Windows implementation, the PNAPI 452 builds remote application file associations and manages the "Start" menu and desktop icons for application object shortcuts.

Program Neighborhood User Interface

The user interface module 456 interfaces the PNAPI 452 and may be a functional superset of an existing client-user interface (e.g., Remote Application Manager). The user interface module 456 accesses the information stored in the local cache 460 through the PNAPI 452 and visually presents that information to the user on the display screen of the client node 102A. The displayed information is a mixture of information generated by a user of the client node 102A and information obtained by the Program Neighborhood application. The user interface module 456 may also show the user all applications that the user is currently running and all active and disconnected sessions.

In a windows-based embodiment, the user interface module 456 may present a variety of graphical components, such as windows and pull-down menus, to be displayed on the display screen. A display of a combination of such graphical user interface components is generally referred to as a "desktop." A desktop produced by the user interface module 456 may include a Program Neighborhood window displaying the neighborhood of application programs available to the user of the client node 102A for use. These application programs are a filtered combination of the published applications hosted by a server farm on the network. The user interface module 456 may generate a Program Neighborhood window for each server farm or merge the applications from different server farms under a single Program Neighborhood window.

At a top level, the Program Neighborhood window includes a folder for each server farm. Clicking on one of the folders with the mouse produces a window containing a representation (e.g., an icon) of each hosted application available to the user, e.g., see FIGS. 6A and 6B. The Program Neighborhood window becomes the focal point for launching published applications, and the user interface module 456 may be used to launch applications through the PNAPI 452 For example, the user of the client node 102A may use the mouse to select one of the displayed icons and launch the associated application.

A feature of a client-based implementation is that the user may browse the objects displayed in the Program Neighborhood window although the client node is offline, that is, the ICA connection 462 is inactive. Also, a user of the client node 102A may drag application objects and folders out of the Program Neighborhood window and into other graphical components (e.g., other windows, folders, etc.) of the desktop.

Figure 4J:
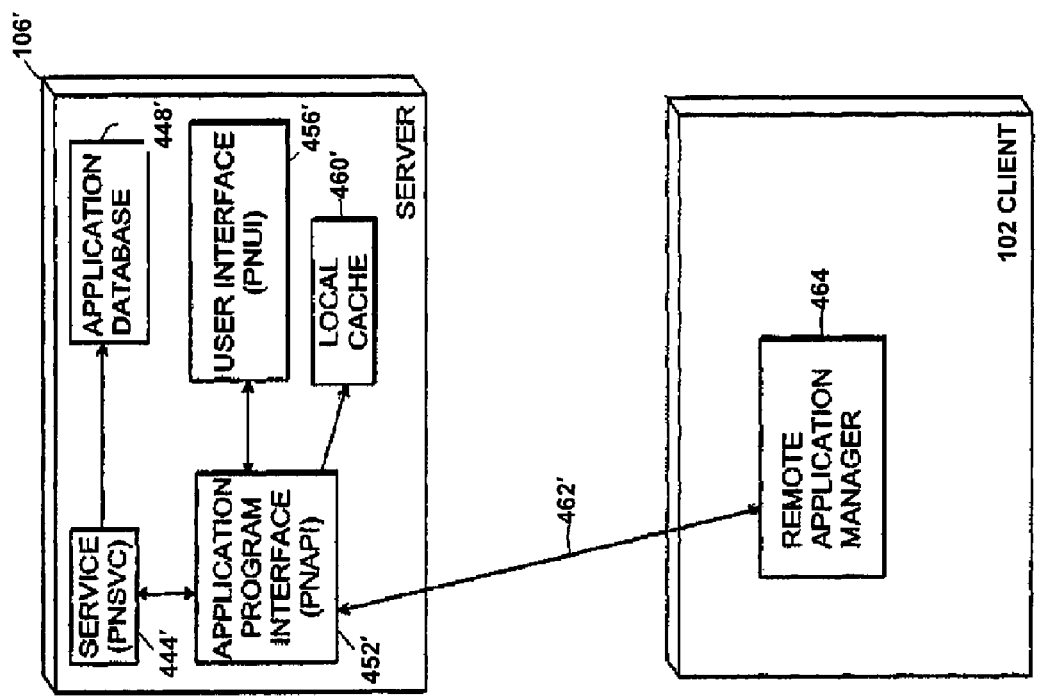
FIG. 4J is a block diagram of a client-based computing embodiment in which a client node having an installed program neighborhood application is in communication with one of the server nodes.

FIG. 4J shows an example arrangement of program components for a server-based implementation of the Program Neighborhood application. The components include a Service (PNSVC) component 444', an Application Database component 448', an Application Program Interface (PNAPI) component 452', a User Interface component 456' and a local cache 460'. Each software component 444', 448', 452', 456', and 460' is installed on the application server 106A. The software components for the server-based implementation correspond to the software components for the client-based implementation of FIG. 4. The functionality of each server-based software component is similar to the client-based counterpart, with differences or added capabilities described below. The PNSVC 444' communicates with the application database 448' and with the PNAPI 452' using local procedure calls. The PNAPI 524' also communicates with the user interface module 456' and the local cache 460'.

Similar to that described in FIG. 4A for the client node 102A, the client node 102N logs on to the network 104, the server 106A develops and maintains a database containing the application related information collected from the other servers 106B, 106N in the server farm, and a communication link is established between the server 106A and the client node 102N.

The application server 106A is in communication with the client node 102N via an ICA channel connection 462'. The channel connection 462' may be established by an ICA virtual channel protocol (e.g., Thinwire). The Thinwire protocol can be used to transmit presentation commands from Windows-based applications running on the application server 106A to the client node 102N. To a user of the client node 102N, the applications appear to be running on the client node 102N. The client node 102N may include a Remote Application Manager application program 464 that communicates with the application server 106A via the ICA channel connection 462'.

To run the Program Neighborhood application in a server-based implementation, the user of the client node 102N connects to an initial desktop (at the server 106A) and launches the Program Neighborhood application from within that desktop environment. The connection to the initial desktop can occur automatically, e.g., via a logon script of the client node 102N, via an entry in the StartUp group in Windows 95, or by another centrally managed server specific mechanism. All remote application management and launching is accomplished through this initial desktop.

Similar to that described in FIG. 4A for the server 106A, the server 106 uses the user credentials to determine those application programs that are authorized for use by the user of the client node 102N. A Program Neighborhood graphical window is returned to the client node 102N and displayed on the client screen. This window may include icons representing the available and, possibly, the unavailable application programs that are in the program neighborhood of the client node 102N.

The user of the client node 102N may select and launch one of the application programs displayed in the Program Neighborhood window. When launching an application, the Program Neighborhood application can execute the application on the same server 106, where applicable, taking into account load balancing requirements among servers and the availability of the application on that server 106. The PNAPI 452' can include a launch mechanism for launching a remote application locally on the server 106 when the server 106 is nominated to launch the application. When a different server is needed to run the application, the Program Neighborhood application may launch the application via the server 106 (i.e., server-based client) using the windows to present the application on the desktop of the client node 102N.

In one embodiment, the web-based Program Neighborhood application includes a group of objects that manage various aspects of the application. In one embodiment, the application includes three primary object classes that "plug in" to a web server: a gateway object class; a credentials object class; and an application object class. In some specific embodiments, the object classes are provided as Java beans. The three primary object classes facilitate: validation of user credentials into a server farm; generation of lists of published applications that a specified user may access; provision of detailed information about a specific published application; and conversion of published application information into an ICA-compatible format.

When provided as Java beans, the objects may be accessed in a number of different ways. For example, they may be compiled as COM objects and made available to the web server as ActiveX components. In another embodiment, the Java beans can be used in their native form, such as when the server uses Java Server Pages technology. In yet another embodiment, the Java beans may be instantiated and used directly in a Java servlet. In still another embodiment, the server 106 may instantiate the Java beans as COM objects directly.

A credentials object class manages information necessary to authenticate a user into a target server farm. A credentials object passes stored user credentials to other Program Neighborhood objects. In some embodiments, the credentials object is an abstract class that cannot be instantiated and represents a user's credentials. Various class extensions may be provided to allow different authentication mechanisms to be used, including biometrics, smart cards, token-based authentication mechanisms such as challenge-response and time-based password generation, or others. For example, a "clear text credentials" extension may be provided that stores a user's name, domain, and password in plain text.

A gateway object class handles communications with a target server farm. In one embodiment, the gateway object class is provided as an abstract Java class that cannot be instantiated. A particular gateway object may retrieve application information by communicating with a server farm using a particular protocol, reading cached application information, a combination of these two methods, or other various methods.

As noted above, the gateway object class caches information to minimize communication with a target server farm. Extensions to the gateway object may be provided to communicate with the server farm over specific protocols, such as HTTP. In one embodiment, an extension class is provided that allows the gateway object to communicate with the server farm via WINDOWS NT named pipes. The gateway object may provide an application programming interface hook that allows other Program Neighborhood objects to query the object for application information.

An applications object class contains information about published applications and returns information about applications hosted by the server farm in order to create the Program Neighborhood web page. The applications object class creates objects representing applications by retrieving information relating to the applications, either from an object created by the gateway object or directly from the servers in the server farm. An applications object acts as a container for certain properties of the application, some settable and some not settable, such as: the name of the application (not settable); the percentage of the client's desktop that the client window should occupy (settable); the width of the client window, in pixels, for this application (settable); the height off the client window, in pixels, for this application (settable); the number of colors to use when connecting to the application (settable); the severity of audio bandwidth restriction (settable); the level of encryption to use when connecting to the application (settable); the level of video to use when connecting to this application (settable); whether the application should be placed on a client's start menu (settable); whether the application should be placed on the client's desktop (settable); the identity of the Program Neighborhood folder to which the application belongs (settable); the description of the application (settable); the source of the graphics icon file for the application (settable); the type of window that should be used when connecting to the application (not settable); and whether to override default parameters for the object.

Figure 5A:
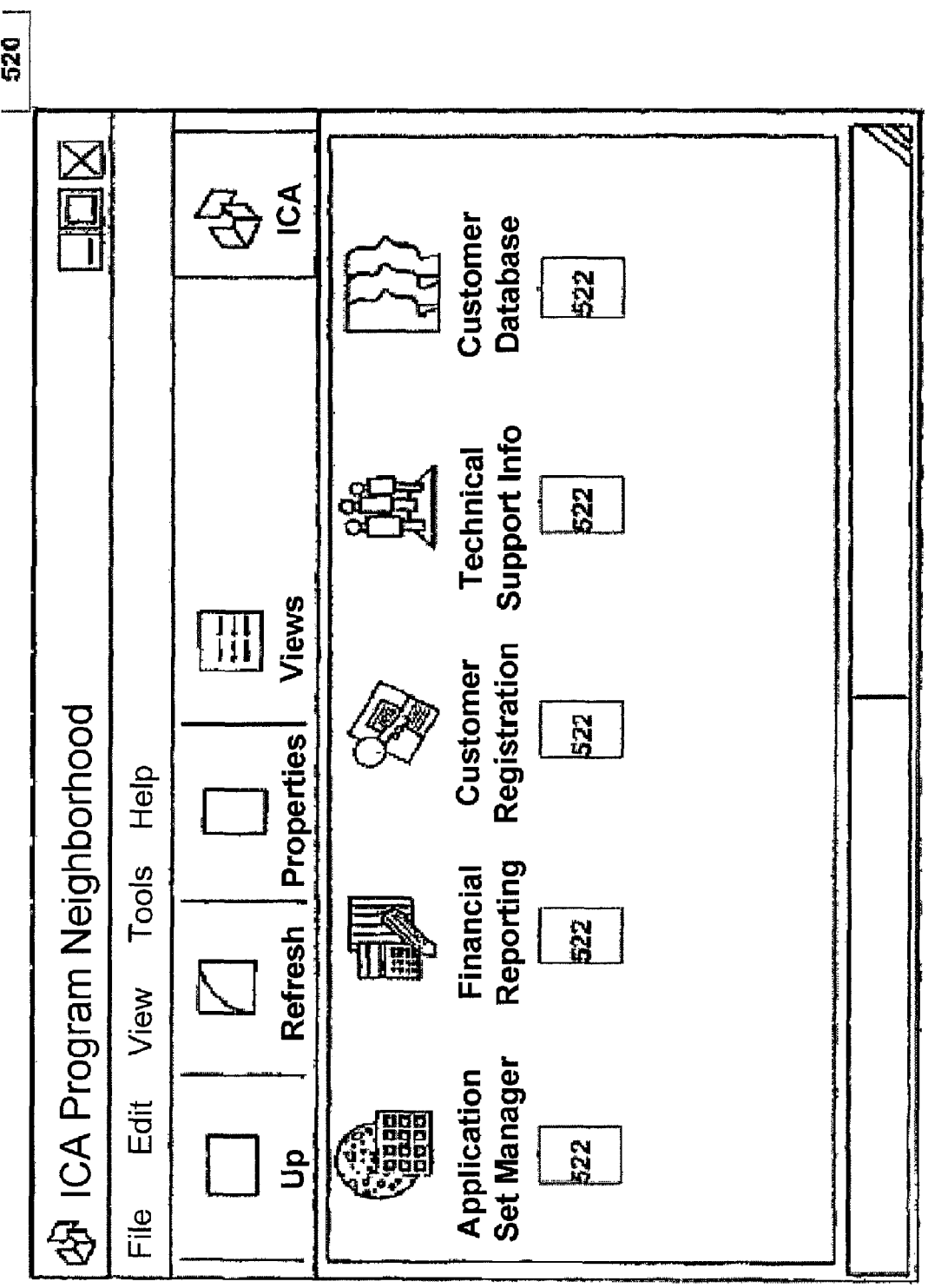
FIG. 5A is a block diagram of a server-based computing embodiment in which a client node is in communication with a server node having an installed program neighborhood application program.

FIG. 5A is a screenshot of an example Program Neighborhood window 520 that may be displayed on the screen of either client node 102A, 102N after the Program Neighborhood application has executed. The window 520 includes graphical icons 522. Each icon 522 represents an application program that is hosted by one of the servers 106A, 106B, and 106N on the network 104. Each represented application is available to the user of the client node for execution. The user may select and launch one of the applications using the mouse, or keyboard.

Figure 5B:
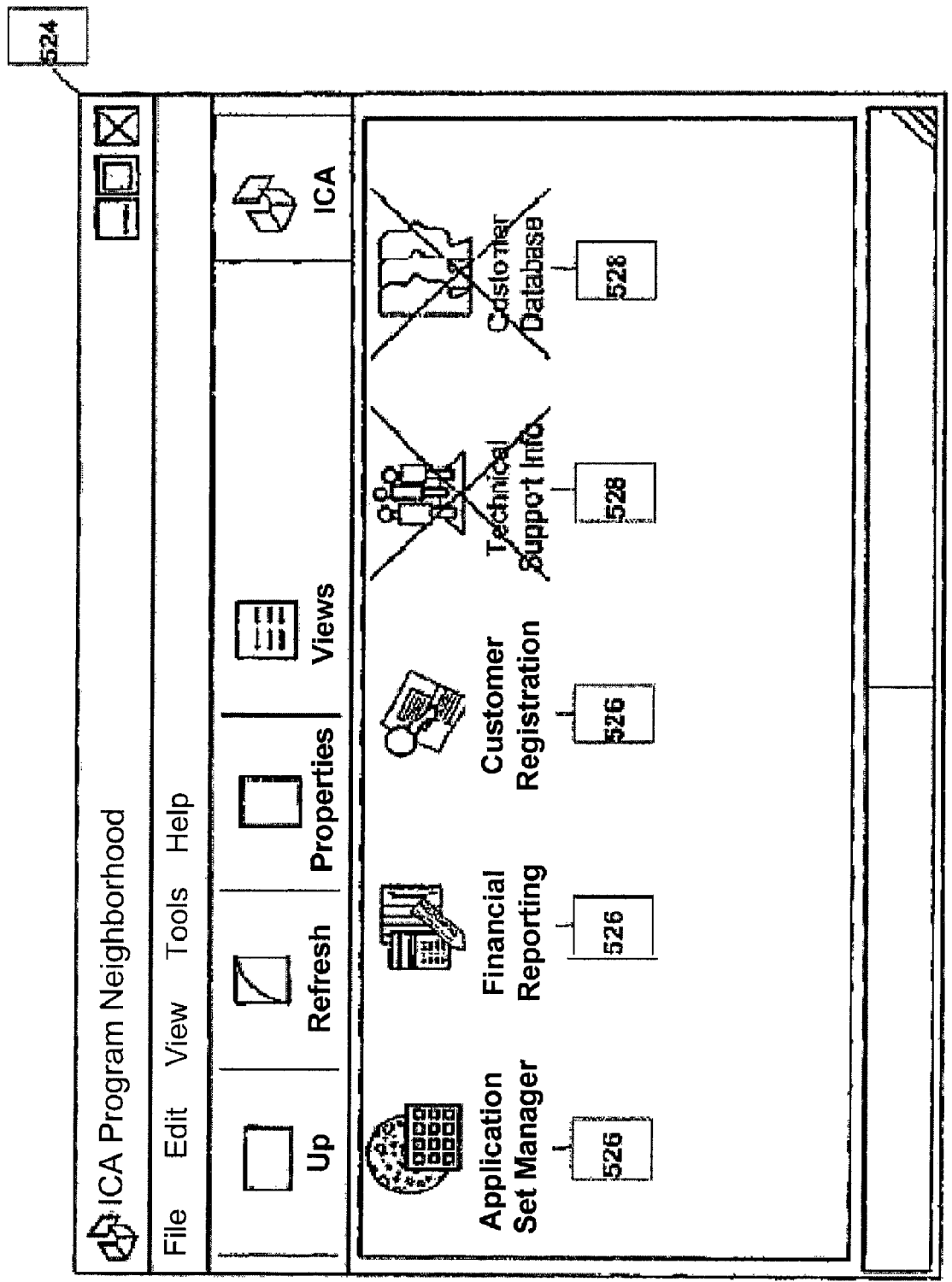
FIG. 5B is a screen shot of an embodiment of a display on the screen of a client node after the program neighborhood application program is executed.

FIG. 5B is a screenshot of another example embodiment of Program Neighborhood window 524 that may be displayed on the screen of either client node 102A, 102N after the Program Neighborhood application has executed. The window 524 includes graphical icons 526, 528. Each icon 526, 528 represents an application program that is hosted by one of the servers 106A, 106B, and 106N on the network 104. Each application program represented by one of the icons 526 is available to the user of the client node 102A, 102N for execution. The user may select and launch one of the applications using the mouse or keyboard. For web-based program neighborhood environments, the screenshots of FIGS. 5A and 5B are similar, except that icons 522, 566, 528 are displayed within a browser window.

Each application program represented by one of the icons 528 is unavailable to the user of the client node 102A, 102N, although such applications are present in the server farm. The unavailability of these application programs can be noted on the display screen (e.g., "X"s can be drawn through the icons 528). An attempt to launch such an application program can trigger a message indicating that the user is not authorized to use the application.

Figure 6:
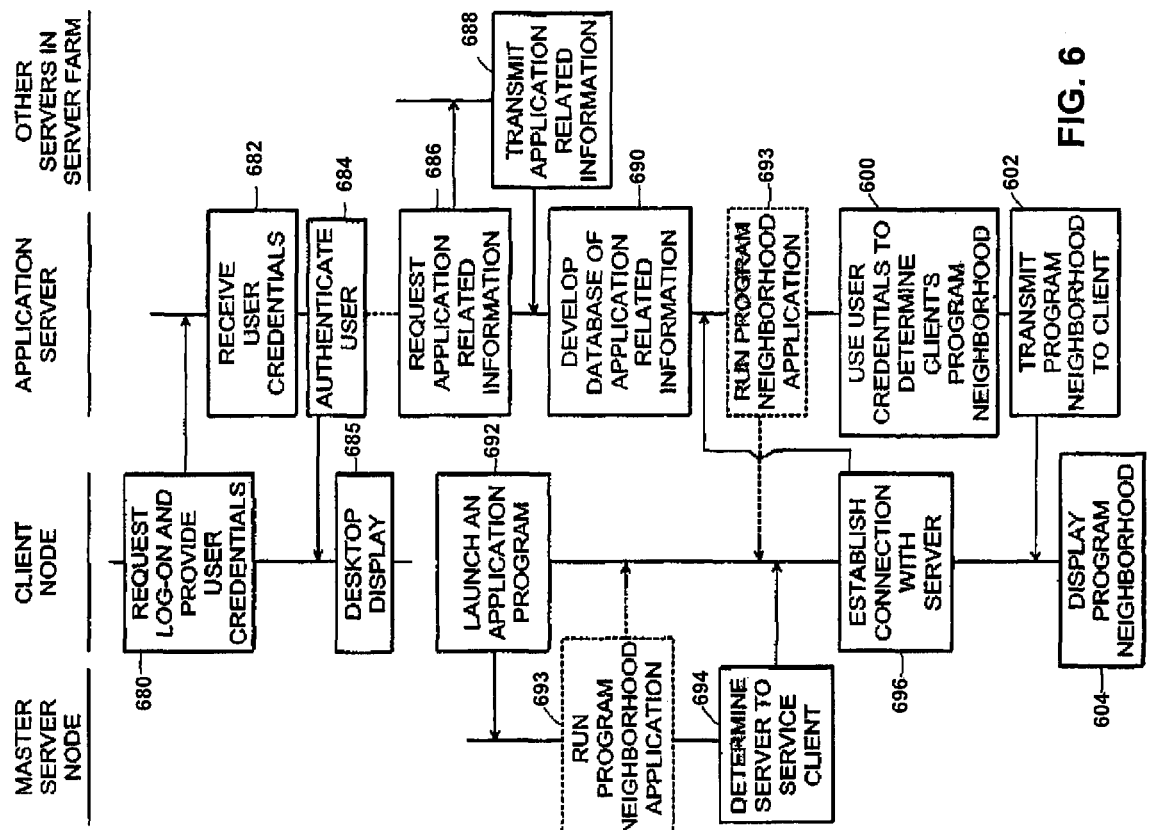
FIG. 6 is a flow chart depicting an embodiment of steps of a process by which a client node is informed as to the availability for use of application programs on the application servers.

FIG. 6 shows an example process by which a user of either client node 102A, 102N may be informed about the availability of applications hosted by application servers 106A, 106B, and 106N on the network 104. In step 680, the client node 102A, 102N requests log-on service from one of the servers, e.g., server 106B. The server 106B requires valid user credentials to establish the connection. The server 106B receives the user credentials from the client node 102A (step 682), and authenticates the user for log-on (step 684). A desktop is displayed at the client node 102A, 102N (step 685). The desktop can include a graphical icon representing the Program Neighborhood application program.

At step 686, the application server 106A establishes a connection with each other servers 106B and 106N to exchange application-related information, as described above, corresponding to application programs hosted on those servers (step 688). In step 690, the application server 106B develops and maintains a database of the collected application-related information. Each other server 106A and 106N in the server farm may develop a database equivalent to the database of the server 106B and in similar manner as the server 106C. In another embodiment, the database of the server 106B may be a centralized database that is accessible to each other application server 106A and 106N in the server farm. The collecting of application-related information may occur independently or be triggered by the request of the client node 102A, 102N to log-on to the server farm 38.

In step 692, the client node 102A, 102N may request execution of an application program from the desktop display. The master server node may process the request and, using a load-balancing evaluation and application availability as described above, determine the application server to provide the service to the client node 102A, 102N (step 694). For example, the application server 106A may be selected to service the request with the client node 102A, 102N. In step 696, the client node 102A, 102N establishes a communications link with the server 106B. The server 106B and the client node 102A, 102N may communicate according to the ICA protocol appropriate for that client node as described above.

Also in response to this request to run the application program, the master server node 106A or the server 106B may run the Program Neighborhood application (step 693) and push the results to the client node 102A, 102N, although the client node 102A, 102N may not have requested the Program Neighborhood application program. When executing the Program Neighborhood application program, the master server node 106A or server 106B filters the application-related information in the database using the user credentials (step 600). The result of filtering the database determines those application programs that are authorized for use by the user of the client node 102A, 102B. The authorized application programs are in the program neighborhood of the client node 102A, 102N. This program neighborhood of available application information is pushed to the client node 102A, 102N (step 602) and displayed on the client screen in a Program Neighborhood graphical window (step 604).

In other embodiments, the Program Neighborhood window may include applications that are in the server farm but unavailable for use to the client node 102A, 102N. In a Windows-based implementation, the available (and unavailable) application programs can be represented by icons. The user of the client node 102A, 102N may select and launch one or more of the application programs displayed in the Program Neighborhood window.

E. Load Balancing Remote Access Server Farm

Figure 7A:
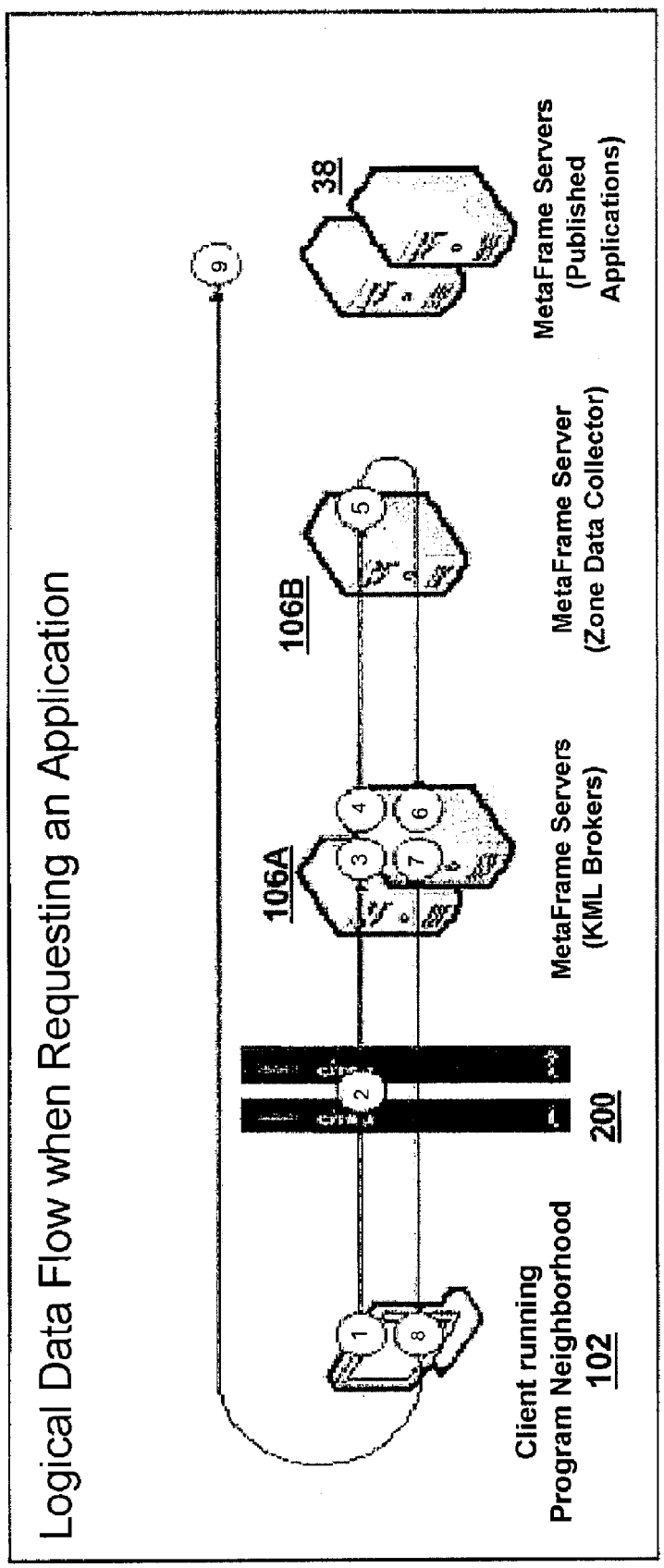
FIG. 7A is a diagram depicting an embodiment of a data flow traversing an appliance and components of a remote access server farm.
Figure 7B:
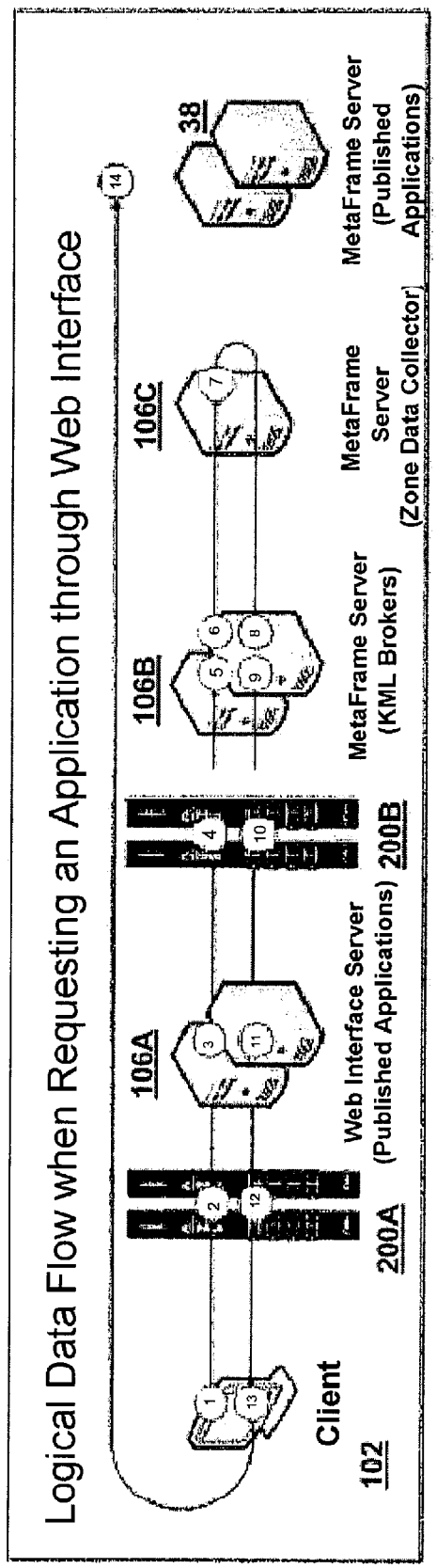
FIG. 7B is a diagram depicting another embodiment of a data flow traversing one or more appliance sand components of a remote access server farm.
Figure 7C:
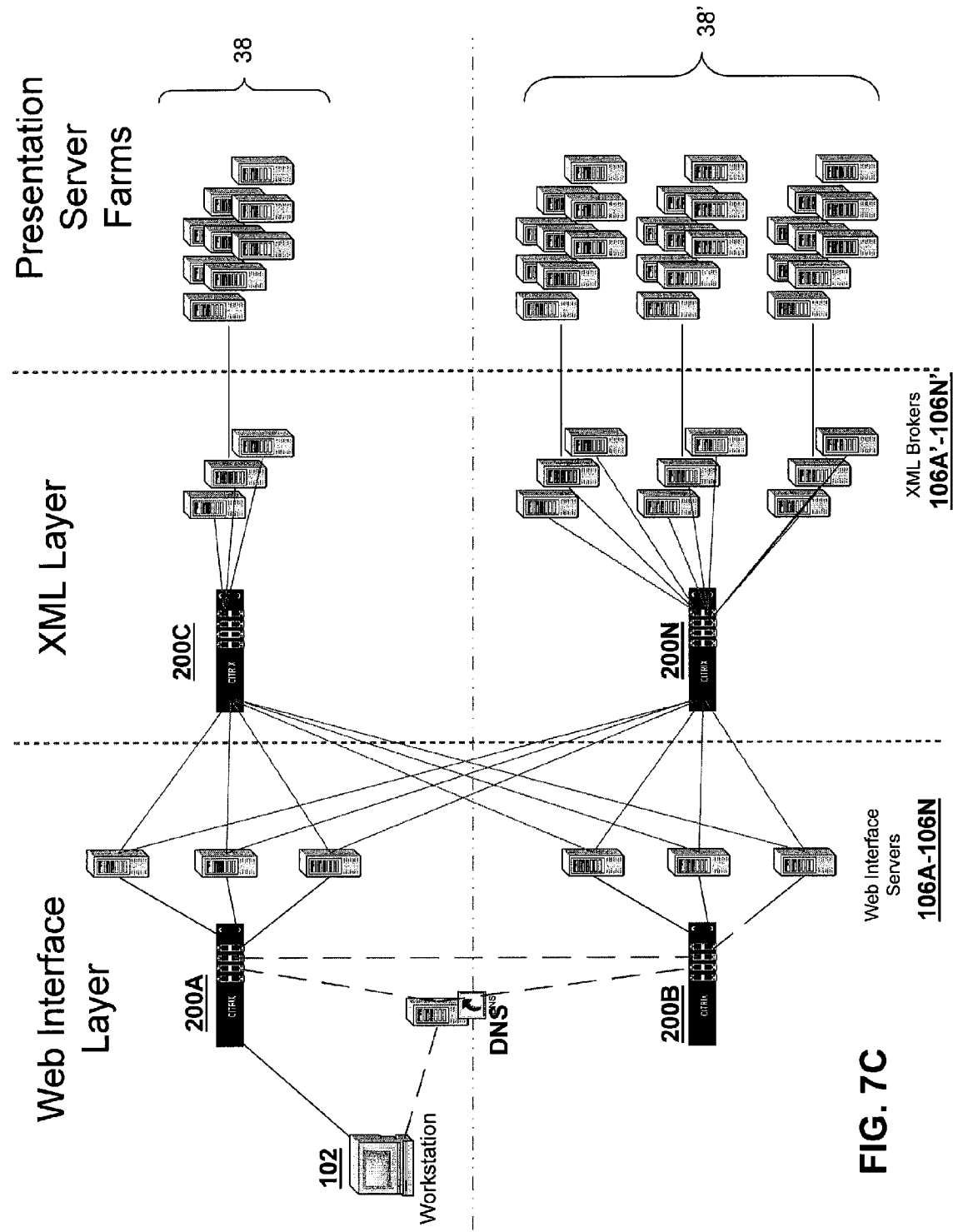
FIG. 7C is a block diagram depicting an embodiment of appliances load balancing components providing access to a remote access server farm.

Referring now to FIGS. 7A-7C, embodiments of using one or more appliances to monitor the state of components of a remote access server farm and to load balance these components are depicted. Embodiments of the appliance 200 as depicted in FIG. 2A may used to deploy techniques for monitoring the functional state of components of a remote access server farm, such as those components discussed above in conjunction with FIGS. 4A-6. The embodiments described in conjunction with FIGS. 7A-7C will generally be discussed in view of the embodiment of a Citrix Presentation Server farm as the remote access server farm. In these embodiments, the Citrix Presentation Server farm includes an XML service component for providing an enumerated list of published applications available from a server in the farm and a web interface component for processing a depiction of resources of the remote access server farm. Descriptions of an embodiment of the XML service component and the web interface component are described above as servers 106A-106N in conjunction with FIGS. 4A-4J. The Citrix XML Service is queried by client applications in a Presentation Server farm to return a list of the applications to which a user has access. All Citrix Presentation Servers have an XML Service and IMA Service. In large scale environments, typically a number of Citrix Presentation Servers are used as dedicated XML Brokers, which may be used primarily to enumerate applications for clients and assist with selecting the least loaded server from the farm that are available to serve an application Referring now to FIG. 7A, an embodiment of a system for requesting by a client from an interface service a list of published applications available from the remote access server farm is depicted. In brief overview, at step 1, a client 102 running a program neighborhood application or any services thereof transmits a request to an interface service, such as the interface running on the XML Broker 106A. The appliance 200 intercepts or receives the request at step 2, and selects one of a plurality of XML services 106A for which to forward the request. For example, a VIP 275 of the appliance 200 may be configured to process and load balance XML interface requests to an XML interface. The appliance 200 forwards the request to the selected XML service.

At step 3 of FIG. 7A, the XML service on XML broker 106A receives from the appliance 200 the request of the client and forwards the request to a local IMA service, running on the XML Broker 106A. At step 4, the local IMA service communicates with the IMA service operating on the Zone Data Collector server 106B. At step 5, the Zone Data Collector server 106B checks storage, e.g., a dynamic store, of the remote server farm that identifies the least loaded server having the requested application. The Zone Data Collector Server 106B may send an IMA ping to the lead loaded server to verify the server's availability. The Zone Data Collector server 106B returns the host identifier, or HostID, of the server to the XML Broker 106A. At step 6, the XML service receives the host identifier of the least loaded server, and at step 7, the XML service looks up the host identified in a local host cache. The XML service sends a response back to the client 102 via the appliance 200. At step 8, the client 102 receives a response having the ICA file from the appliance 200. At step 9, the client 102 initiates a session, such as an ICA session, directly with the server identified via the response, and in this example, the least loaded server in the presentation server farm.

Referring now to FIG. 7B, an embodiment of a system for providing application enumeration with the components of a Web Interface and an XML service of the Citrix Presentation Server farm is depicted. The Web Interface may provide a user interface, such as web-based depiction of the list of available published applications from the server farm. Furthermore, a first appliance 200A may load balance or perform traffic management for the Web Interface Servers while a second appliance 200B may load balance or perform traffic management for the XML interfaces.

At step 1 as depicted in FIG. 7B, the client 102 communications a request for application enumeration or for an application to the Web Interface Server 106A. At step 2, the appliance 200A via a VIP 275 for the Web Interface received the client request, and selects one of a plurality of Web Interface Servers 106A for which to forward the request. At step 3, the selected Web Interface Server 106A receives the client's request forwarded by the appliance 200A The Web Interface Server 106A forwards an XML request to the XML service of the XML broker 106B. At step 4, the second appliance 200B receives this request and selects the XML Broker 106B for which to forward the request. For example, a VIP 275 on appliance 200A may be configured to manage one or more XML interface services. The appliance 200B forwards the request to the selected XML service 106B

At step 5, the XML service 106B receives the request forwarded by appliance 200B. The XML service 106B communicates the request to a local IMA service. At step 6, in response, the local IMA service communicates with the IMA service on the Zone Data Collector server 106C. At step 7, the Zone Data Collector server 106C checks a storage, e.g., a dynamic store, of the remote server farm that identifies the least loaded server having the requested application. The Zone Data Collector Server 106C may send an IMA ping to the least loaded server to verify the server's availability. The Zone Data Collector server 106C returns the host identifier of the server to the XML Broker 106B. At step 8, the XML service receives the host identifier or HostID of the least loaded server. At step 9, the XML service looks up the host identifier in a local host cache. The XML service sends a response back to the 200B. At step 10, the appliance 200B receives the response and communicates the XML response back to appropriate Web Interface Server. In some embodiments, the appliance 200 communicates the response based on a COOKIEINSERT persistence type. At step 11, the Web Interface Server 106A receives the XML response and packages ICA file with a template 490 and sends the ICA file to the client via appliance 200A. At step 12, the appliance 200A receives the ICA file from the Web Interface Server 106A and communicates the ICA file to the client 102. At step 13, the client 102 receives a response having the ICA file from the appliance 200A. At step 14, the client 102 initiates a session, such as an ICA session, directly with the server identified via the response, and in this example, the least loaded server in the presentation server farm.

Referring now to FIG. 7C, an embodiment of an environment for using appliances 200A-200N for managing traffic between components of a remote access server farm is depicted. In brief overview, a first set of appliances 200A-200B are deployed between a client 102 and a plurality of Web Interface Servers 106A-106N. The appliance 200A may manage a primary set of web interface services 106A-106N, and appliance 200B may manage a backup or secondary set of web interface services. A second set of appliances 200C-200N may be deployed between the Web Interface Servers and a plurality of XML Brokers 106A'-106N', providing an interface service to one or more presentation server farms 38. The appliance 200C may manage a primary set of XML services while the appliance 200N may manage a backup or secondary set of XML services. The server farms 38 and 38' may be deployed at one or more data centers.

In the embodiment depicted in FIG. 7C, the components of the remote access server farm are deployed on dedicated servers. A plurality of Web Interface Servers are deployed on a plurality of servers. A plurality of XML Interfaces are deployed on a plurality of XML broker servers. In these embodiments, the load sharing of these remote access server components are distributed among a plurality of dedicated servers. Although FIG. 7C depicts the Web Interface and XML Interface services on separate servers, any one or more Web Interface and XML Interface components may be deployed on the same server.

F. Monitoring Operational and Functional State of Components of the Remote Access Server Farm Referring now to FIG. 8A, a block diagram of an appliance 200 having a plurality of monitoring agents to monitor a network service is shown. In brief overview, an appliance 200 comprises a plurality of monitoring agents 820A-820N (generally referred to herein as agents 820, and also referred to as probes). Each of the plurality of monitoring agents may be assigned to monitor one or more services 270A-270N. A monitor may be associated with or bound to a VIP service 275A-275N. For example, monitors 820A-820B may be bound to a Web Interface VIP service 275A, and monitors 820C-820N may be bound to XML VIP service 275N.

A monitoring agent may comprise any application, program, script, daemon, or other computing routine that reports a performance or operational characteristic of a network service 270 to the appliance 200. A monitoring agent may communicate with a network service 270 once, or on a predetermined frequency, such as every 1 msec or 1 sec. In some embodiments, a monitoring agent 820 may use a request/reply messaging mechanism or protocol with the service 275. In other embodiments, a monitoring agent 820 may have a custom or proprietary exchange protocol for communicating with the server. In some embodiments, a single monitoring agent may monitor a plurality of services. In other embodiments, a plurality of agents may monitor a single service. In still other embodiments, a plurality of monitoring agents may each monitor a plurality of services or servers, wherein each of the plurality of servers or services is monitored by a plurality of monitoring agents.

In the embodiment shown, the one or more monitoring agents 820 are associated with one or more network services 270A-270N. In other embodiments, the one or more monitoring agents may monitor an appliance 200, vServer, network service 270, client, or any other network resource. In one embodiment, a user specifies a type of network service to associate with the one or more monitoring agents 820. In another embodiment, a user customizes a monitoring agent. In still another embodiment, a generic monitoring agent 820 is used. In yet another embodiment, the one or more monitoring agents 820 determine the response time of the one or more network services 270 for responding to a request of one of the following types: ping, transport control protocol (tcp), tcp extended content verification, hypertext transfer protocol (http), http extended content verification, hypertext transfer protocol secure (https), https extended content verification, user datagram protocol, domain name service, and file transfer protocol.

In some embodiments, the one or more monitoring agents 820 are protocol-specific agents, each agent determining availability for a network service of a particular protocol-type. In some embodiments, a monitoring agent 820 determines a response time of a server 106 or network service 270 to a TCP request. In one of these embodiments, the agent uses a "TCP/ICMP echo request" command to send a datagram to the network service 270, receive a datagram from the network service 270 in response, and determine a response time based on the roundtrip time of the datagram. In another of these embodiments, the monitoring agent 820 verifies that the response from the network service 270 included expected content and did not contain errors.

In other embodiments, a monitoring agent 820 determines availability of a network service 270 to a UDP request. In one of these embodiments, the agent uses a "UDP echo" command to send a datagram to the network service 270, receive a datagram from the network service 270 in response, and determine a response time based on the roundtrip time of the datagram. In another of these embodiments, the monitoring agent 820 verifies that the response from the network service 270 included expected content and did not contain errors.

In still other embodiments, the monitoring agent 820 determines availability of a network service 270 to an FTP request. In one of these embodiments, the monitoring agent 820 sends an FTP command, such as a "get" command or a "put" command, to the network service 270 and determines a time needed by the network service 270 to respond to the command. In another of these embodiments, the monitoring agent 820 verifies that the response from the network service 270 included expected content, such as contents of a file requested by a "get" command, and did not contain errors.

In yet other embodiments, the monitoring agent 820 determines availability of a network service 270 to an HTTP request. In one of these embodiments, the monitoring agent 820 sends an HTTP command, such as a "get" request for a uniform resource locator (URL) or a file, to the network service 270 and determines a time needed by the network service 270 to respond to the request. In another of these embodiments, the monitoring agent 820 verifies that the response from the network service 270 included expected content, such as the contents of a web page identified by the URL, and did not contain errors.

In further embodiments, the monitoring agent 820 determines availability of a network service 270 to a DNS request. In one of these embodiments, the monitoring agent 820 sends a DNS request, such as a dnsquery or nslookup for a known network address, to the server 106 or network service 270 and determines a time needed by the server 106 or network service 270 to respond to the request. In another of these embodiments, the monitoring agent 820 verifies that the response from the network service 270 included expected content, such as the domain name of a computing device 100 associated with the known network address, and did not contain errors.

A monitoring agent 820 may be assigned a weight by a network appliance 200. A weight may comprise an integer, decimal, or any other numeric indicator. In some embodiments, a user may configure the weight corresponding to a given monitoring agent 820. In some embodiments, all monitoring agents may be assigned equal weight. In other embodiments, a plurality of monitoring agents may each be assigned different weights. The weights may be assigned to the monitors based on any criteria indicating relative importance, including without limitation importance of the monitored service, reliability of the monitoring mechanism, and the frequency of monitoring.

In one embodiment, a monitoring agent may be assigned a weight based on the relative importance of the service the appliance monitors. For example, if most user requests in a given environment were HTTP requests, a monitoring agent monitoring HTTP availability of a server 106 might be assigned a weight of 10, while a monitoring agent monitoring FTP availability of a server 106 might be assigned a weight of 3. Or, for example, if an administrator placed a high priority on UDP applications, a monitoring agent monitoring UDP availability of a server may be assigned a weight of 20, while a DNS monitoring agent may be assigned a weight of 5.

In some embodiments, an appliance 200 may compute a sum of the weights of the monitoring agents currently reporting a network service 270 as operational. For example, if five monitoring agents, each assigned a weight of 30, are monitoring a network service 270, and three of the five monitoring agents report the network service 270 as available, the appliance may determine the sum of the monitoring agents currently reporting the network service 270 as operational to be 90. Or for example, if only two monitoring agents, one with a weight of 20 and the other with a weight of 40, are reporting a server 106 as available, the appliance may compute the sum of the monitoring agents currently reporting a server 106 as operational.

In some embodiments, the appliance 200 includes multiple types of monitoring agents. In one embodiment, a monitoring agent 820 may be a kernel based or kernel-mode agent. A kernel type monitor probes packets assembled within the kernel of the appliance. In one example, a kernel type monitors may be configures to perform a TCP-ECV (Extended Content Verification) to search for a string in an HTTP response, such as from a Web Interface. In another embodiment, the agent 820 may be a user mode based agent, referred to as an advanced monitor, user monitor or scriptable monitor. In some embodiments, an advanced monitors is a custom script that runs in user memory space on the appliance. An Advanced Monitor may be written in a number of programming languages, including Shell, Perl or Python. In some cases, the monitor is a binary executable instead of being written in an interpreted scripting language The result of the test or probe of a monitoring agent may dictate a change in a state of the service 275, e.g., UP/DOWN, to which the monitor is bound. In one embodiment, the monitoring agent returns a value of 0 to indicate success and a non-zero value to indicate an error or a failure. The kernel of the appliances may interpret the returned 0 value as a success, and anything other than zero as a failure. In response to the receiving the returned value from the monitoring agent, the appliance may mark the state of the service accordingly. In one embodiment, the appliance marks the service as FAILED when the value of the retries parameter is met. The appliance then moves the service or server out of load balancing, reducing the chance that users may experience problems getting to their applications.

The monitoring agent (monitor) may use one or more parameters to control monitoring behavior. In one embodiment, the monitor includes or uses an interval parameters. The interval may indicate the time in seconds between probes sent to a service. In another embodiment, the monitor includes a response timeout parameter to specify the amount of time the kernel of the appliance waits for the response from the monitor probe. In some embodiments, the monitor includes or uses a retires parameter which identifies the number of times the probe must fail before the kernel of the appliances marks the service as marked DOWN or otherwise unavailable. In yet another embodiment, the monitors includes or uses a downtime parameter which identifies an amount of time in seconds that the kernel of appliance may wait before initiating another probe after the service has been marked DOWN or unavailable.

Figure 8A:
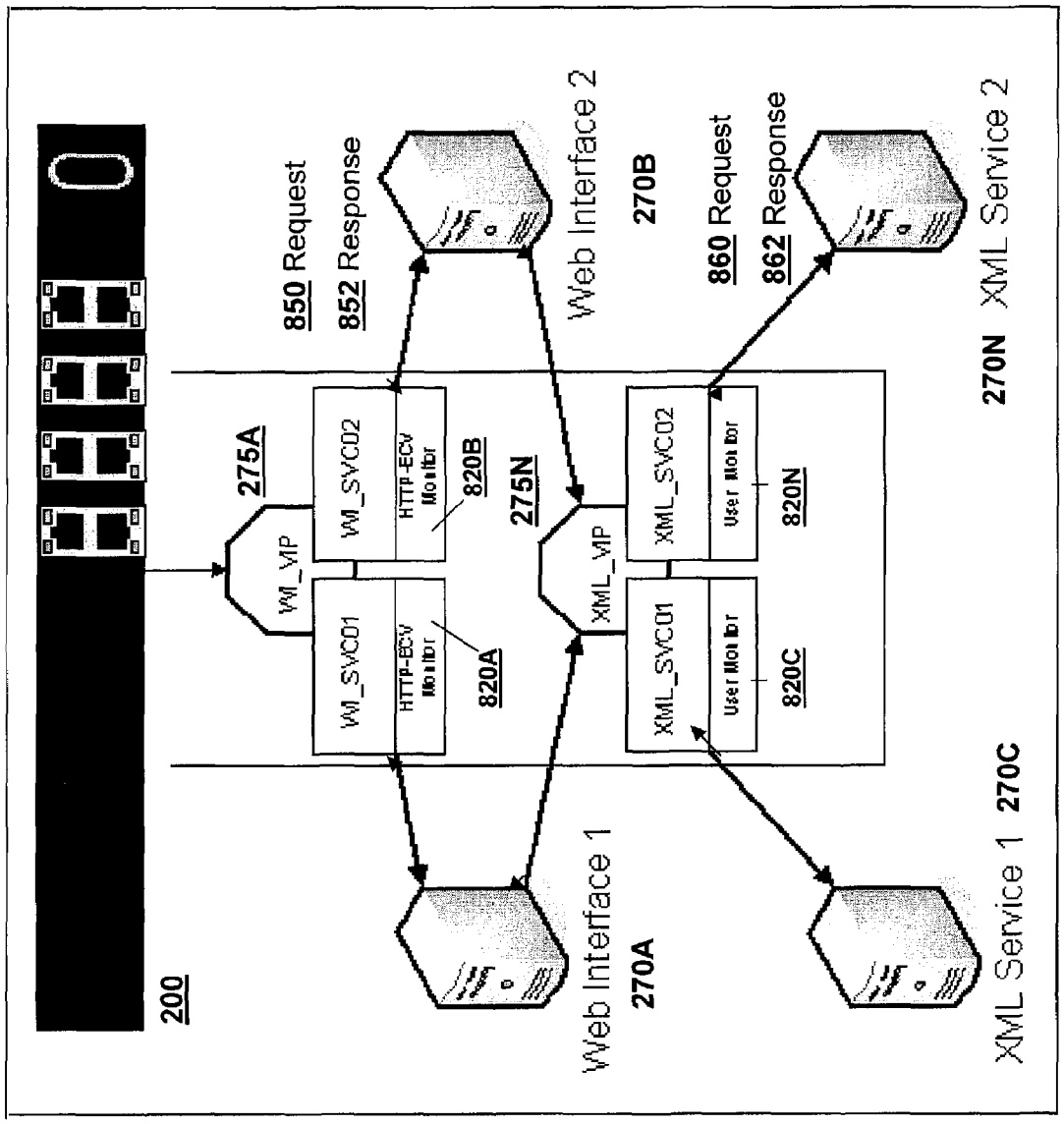
FIG. 8A is a block diagram depicting an embodiment of an appliance monitoring functional and operational state of one or more components of a remote access server farm.

Still referring to FIG. 8A, the appliance 200 may be used to monitor the state of components of the remote access server farm, such as those depicted in FIG. 7C. In some embodiments, the appliance 200 monitors these components to determine or distinguish between components that are operational and not functional versus those components that are operational and functional. A component may be operational in that the component is running or executing. That is, in some embodiment, an operational component is a component that is responsive but may not perform the component's functionality correctly, or as intended, expected or designed. A component may be not functional in that the component does not perform component's functionality correctly, or as intended, expected or designed—even though the component may be operational. In some embodiments, an operational and not functional component may return a response to a monitor's probe but the response had errors or otherwise indicates a failure. In other embodiments, an operational and functional component returns a response to the monitor's probe and the response does not include any errors or otherwise does not indicate a failure. In yet another embodiment, a non-operational component may not return a response.

Some of the components to the remote access server farm may depend on one or more supporting services. For example, functionality of the Web Interface server may be dependent on operation and functionality of an XML Broker, authentication services and/or name services. A component may be operational but if one of the supporting services is not operational and/or not functional, the operational component may not function properly. In other cases, un-trapped failures may cause an operational component to be not functional, such as returning undesired responses. By the appliance monitoring for functional state of operational components, the appliance may avoid routing users to non-functional components of the remote access server farm, such as non-functional Web Interface services and XML interface services.

In one embodiment, a monitoring agent of the appliance is designed, constructed or configured to determine the functional and operational state of an XML Interface service. In the Citrix Presentation Server environment, an XML service may provide an enumeration of the available published applications in the remote access server farm. The following comprises an embodiment of a request 860 by the monitoring agent 820 to probe the XML service:

```
<?xml version="1.0" encoding="UTF-8"?>
<!DOCTYPE NFuseProtocol SYSTEM "NFuse.dtd">
<NFuseProtocol version="4.1">
<RequestAddress>
<Flags>no-load-bias</Flags> ###
<Name>
<AppName>notepad</AppName>
</Name>
</RequestAddress>
</NFuseProtocol>
```

This request is asking the XML service if the Windows application published as notepad is available. In some embodiments, for this request to be successful, one or more components of the Presentation Server farm must be functioning correctly. This request may be used by the appliance to validate whether or not a given XML service is functional and should continue to remain available for users to enumerate available applications. In some embodiment, the request 860 includes an indicator to indicate to the XML service to not consider the request in making load balancing decisions. For example, in one embodiment, the line in the request 860 above marked with ### may be added to prevent the remote access server farms, such as via IMA Service on the Zone Data Collector (ZDC), from adjusting the apparent load on the server that is determined to be least loaded. Otherwise, after a short while, in one embodiment, once the monitor has executed a number of times, the requests may have tricked the Zone Data Collection Server into thinking that there are more users than there actually is. Although the request 860 identifies a request for the published application of a notepad, the monitor may use any predetermined published application(s) to probe the XML interface service.

The monitor 820 may use the response 862 to the request 860 to determine whether or not the XML service is functional. In some embodiments, the following response indicates a functional XML Service.

```
<?xml version="1.0" encoding="UTF-8" ?>
<!DOCTYPE NFuseProtocol SYSTEM "NFuse.dtd">
<NFuseProtocol version="4.1">
<ResponseAddress>
<ServerAddress addresstype="dot">5.214.10.251</ServerAddress>
<ServerType>win32</ServerType>
<ConnectionType>tcp</ConnectionType>
<ClientType>ica30</ClientType>
<TicketTag>IMAHostId:13093</TicketTag>
<FarmLoadHint>0</FarmLoadHint>
</ResponseAddress>
</NFuseProtocol>
```

A functional XML interface communicates a response that includes a host identifier, HostID, value in the <TickeTag> parameter of the response 862. A proper XML response is processed by the XML Service or Web Interface and sent to an ICA client, in the form of an ICA file, which would then be used by the client to initiate an ICA session to the Presentation Server for application launch. For indication of a non-functional XML interface, the <TicketTag> is not returned when something fails during the processing of the XML request. In some cases, a non-operational XML interface does not return any response. The monitoring agent may use any host cache, name service, ping or any other technique to determine whether the server identified by the HostId of response 862 is operational. In some embodiments, the host identifier identifies the server of the server farm having the published application or at which the published application is available. Based on the HostId of the response 862, the appliance 200 may determine to mark or maintain the status or state of the XML service as up or otherwise available, and to include this XML service in any load balancing decisions or rotations.

Based on the monitor receiving the above response 862 and/or the host id, the appliance may determine or assume any one or more of the following conditions of the remote access server farm: 1) the IMA Service on the XML Broker is functioning correctly, 2) the Local Host Cache on the XML Broker is valid, 4) The IMA Service on the Zone Data Collector is functioning correctly, 5) the Dynamic Store on the Zone Data Collector is valid, 6) a presentation server in the remote access server farm is available with the requested application, and 7) the XML Service on the XML Broker is functioning correctly.

In some embodiments, the XML service may communicate the following response 862 in response to receiving a malformed request:

```
<?xml version="1.0" encoding="UTF-8" ?>
<!DOCTYPE NFuseProtocol SYSTEM "NFuse.dtd">
<NFuseProtocol version="4.1">
<ResponseAddress>
<ErrorId>parser-error</ErrorId>
</ResponseAddress>
</NFuseProtocol>
```

In this embodiment, the XML service response indicates that the request was improper. The response 862 in this embodiments does include the string <tickettag> or otherwise the <tickettag> string is not present.

The following response 862 indicates a problem with the remote access server farm, such as a non-functional state of the XML interface or any service the XML interface depends on:

```
. <?xml version="1.0" encoding="UTF-8" ?>
<!DOCTYPE NFuseProtocol SYSTEM "NFuse.dtd">
<NFuseProtocol version="4.1">
<ResponseAddress>
<ErrorId>unspecified</ErrorId>
<BrowserError>0x00000024</BrowserError>
</ResponseAddress>
</NFuseProtocol>
```

This response might indicate the requested application is not available or some problem contacting another service, such as IMA. In another embodiment, the XML service may return the following response 862:

```
<?xml version="1.0" encoding="UTF-8" ?>
<!DOCTYPE NFuseProtocol SYSTEM "NFuse.dtd">
<NFuseProtocol version="4.1">
```

-continued

```
<ResponseAddress>
<ErrorId>unspecified</ErrorId>
<MPSError type="IMA">0x80000007</MPSError>
<BrowserError>0x00000024</BrowserError>
</ResponseAddress>
</NFuseProtocol>
```

In this response 862, any of the error related tags —<ErrorId>, <MPSError> or <BrowserError>—may indicate a non-functional XML interface. In one embodiment, the error condition 0x80000007 indicate an error with the IMA service. For example, this error message may indicate or correspond to the IMA error: IMA_RESULT_ENTRY_NOT_FOUND.

In view of an operational XML interface returning a response 862, the monitoring agent 820 may determine whether or not the XML interface is functional based on identifying predetermined elements of the response 862 that identify other components or subsystems of the remote access server farm are operational and/or functional. In one embodiment, the monitoring agent 820 uses the presence or existence of the HostId in the response 862 to determine the XML interface is functional. In some embodiments, the monitoring agent checks the HostId to verify the server in the remote access server farm is available and if so, determines the XML interface is functional. In other embodiments, the monitoring agent determines the XML service is functional based on receiving the HostID and no error tags or identifiers in the response 862.

The following is one embodiment of a request 860 and responses 862 to the interface service for which a monitoring agent of the appliance 200 may determine the functional state of the interface service:

A Request 860:

```
POST /scripts/wpnbr.dll HTTP/1.1
Content-Type: text/xml
Content-Length: 234
Host: SJMIKED
<?xml version="1.0" encoding="UTF-8"?>
<!DOCTYPE NFuseProtocol SYSTEM "NFuse.dtd">
<NFuseProtocol version="4.1">
<RequestAddress>
<Flags>no-load-bias</Flags><Name>
<AppName>notepad</AppName>
</Name>
</RequestAddress>
</NFuseProtocol>
```

Response 862:

```
HTTP/1.1 200 OK
Date: Fri, 02 Jun 2006 14:46:21 GMT
Server: Microsoft-IIS/6.0
MicrosoftOfficeWebServer: 5.0_Pub
X-Powered-By: ASP.NET
Content-type: text/xml
Content-length: 443
<?xml version="1.0" encoding="UTF-8" ?>
<!DOCTYPE NFuseProtocol SYSTEM "NFuse.dtd">
<NFuseProtocol version="4.1">
<ResponseAddress>
<ServerAddress addresstype="dot">5.214.10.251</ServerAddress>
```

-continued

```
<ServerType>win32</ServerType>
<ConnectionType>tcp</ConnectionType>
<ClientType>ica30</ClientType>
<TicketTag>IMAHostId:13093</TicketTag>
<FarmLoadHint>0</FarmLoadHint>
</ResponseAddress>
</NFuseProtocol>
```

The following is a list of embodiments of a request 860 and responses 862 to the interface service for which a monitoring agent of the appliance 200 may determine the functional state of the interface service. These request and response may be communicating during any phase of client 102 requesting an application enumeration from the service.

Phase 1: Obtaining the Farm Name

Request 1: RequestProtocolInfo 860

```
POST /scripts/WPnBr.dll HTTP/1.1
Content-type: text/xml Host: 10.251.57.29:80 Content-Length: 220
Connection: Keep-Alive
<?xml version="1.0" encoding="ISO-8859-1"?> <!DOCTYPE
NFuseProtocol SYSTEM "NFuse.dtd"> <NFuseProtocol
version="1.1">
<RequestProtocolInfo>
<ServerAddress addresstype="dns-port" />
</RequestProtocolInfo>
</NFuseProtocol>
```

Response 1: ResponseProtocolInfo 862

```
HTTP/1.1 200 OK Date: Fri, 02 Jun 2006 15:58:39 GMT Server:
Microsoft-IIS/6.0 MicrosoftOfficeWebServer: 5.0_Pub X-Powered-
By: ASP.NET Content-type: text/xml Content-length: 253
<?xml version="1.0" encoding="ISO-8859-1" ?>
<!DOCTYPE NFuseProtocol SYSTEM "NFuse.dtd">
<NFuseProtocol version="1.1">
<ResponseProtocolInfo>
<ServerAddress addresstype="no-change"></ServerAddress>
</ResponseProtocolInfo>
</NFuseProtocol>
```

Request 2: RequestServerFarmData 860

```
POST /scripts/WPnBr.dll HTTP/1.1 Content-type: text/xml Host:
10.251.57.29:80 Content-Length: 191 Connection: Keep-Alive
<?xml version="1.0" encoding="ISO-8859-1"?> <!DOCTYPE
NFuseProtocol SYSTEM "NFuse.dtd">
<NFuseProtocol version="1.1">
<RequestServerFarmData>
<Nil />
</RequestServerFarmData>
</NFuseProtocol>
```

Response 2: ResponseServerFarmData with ServerFarmName 862

```
HTTP/1.1 200 OK Date: Fri, 02 Jun 2006 15:58:39 GMT Server:
Microsoft-IIS/6.0 MicrosoftOfficeWebServer: 5.0_Pub X-Powered-By:
ASP.NET
```

-continued

```
Content-type: text/xml Content-length: 289
<?xml version="1.0" encoding="ISO-8859-1" ?>
<!DOCTYPE NFuseProtocol SYSTEM "NFuse.dtd">
<NFuseProtocol version="1.1">
<ResponseServerFarmData>
<ServerFarmData>
<ServerFarmName>farm1</ServerFarmName>
</ServerFarmData>
</ResponseServerFarmData>
</NFuseProtocol>
```

Phase 2: Obtaining the list of applications in Program Neighborhood after Application Settings has been configured.

Request 3: RequestProtocolInfo 860

```
POST /scripts/WPnBr.dll HTTP/1.1 Content-type: text/xml Host:
10.251.57.29:80 Content-Length: 220 Connection: Keep-Alive
<?xml version="1.0" encoding="ISO-8859-1"?> <!DOCTYPE
NFuseProtocol SYSTEM "NFuse.dtd"> <NFuseProtocol
version="1.1">
<RequestProtocolInfo>
<ServerAddress addresstype="dns-port" />
</RequestProtocolInfo>
</NFuseProtocol>
```

Response 3: ResponseProtocolInfo 862

```
HTTP/1.1 200 OK Date: Fri, 02 Jun 2006 16:22:43 GMT Server:
Microsoft-IIS/6.0 MicrosoftOfficeWebServer: 5.0_Pub X-Powered-By:
ASP.NET
content-type: text/xml Content-length: 253
<?xml version="1.0" encoding="ISO-8859-1" ?>
<!DOCTYPE NFuseProtocol SYSTEM "NFuse.dtd">
<NFuseProtocol version="1.1">
<ResponseProtocolInfo>
<ServerAddress addresstype="no-change"></ServerAddress>
</ResponseProtocolInfo>
</NFuseProtocol>
```

Request 4: RequestServerFarmData 860

```
POST /scripts/WPnBr.dll HTTP/1.1 Content-type: text/xml Host:
10.251.57.29:80 Content-Length: 191 Connection: Keep-Alive
<?xml version="1.0" encoding="ISO-8859-1"?> <!DOCTYPE
NFuseProtocol SYSTEM "NFuse.dtd"> <NFuseProtocol
version="1.1">
<RequestServerFarmData>
<Nil />
</RequestServerFarmData>
</NFuseProtocol>
```

Response 4: ResponseServerFarmData 862

```
HTTP/1.1 200 OK Date: Fri, 02 Jun 2006 16:22:43 GMT Server:
Microsoft-IIS/6.0 MicrosoftOfficeWebServer: 5.0_Pub X-
Powered-By: ASP.NET Content-type: text/xml Content-length:
289
<?xml version="1.0" encoding="ISO-8859-1" ?>
<!DOCTYPE NFuseProtocol SYSTEM "NFuse.dtd">
<NFuseProtocol version="1.1">
<ResponseServerFarmData>
<ServerFarmData>
<ServerFarmName>farm1</ServerFarmName>
</ServerFarmData>
</ResponseServerFarmData>
</NFuseProtocol>
```

Request 5: RequestProtocolInfo 860

```
POST /scripts/WPnBr.dll HTTP/1.1 Content-type: text/xml Host:
10.251.57.29:80 Content-Length: 220
Connection: Keep-Alive
<?xml version="1.0" encoding="ISO-8859-1"?> <!DOCTYPE
NFuseProtocol SYSTEM "NFuse.dtd"> <NFuseProtocol version="1.1">
<RequestProtocolInfo>
<ServerAddress addresstype="dns-port" />
</RequestProtocolInfo>
</NFuseProtocol>
```

Response 5: ResponseProtocolInfo 862

```
HTTP/1.1 200 OK Date: Fri, 02 Jun 2006 16:22:43 GMT Server:
Microsoft-IIS/6.0 MicrosoftOfficeWebServer: 5.0_Pub X-Powered-By:
ASP.NET Content-type: text/xml Content-length: 253
<?xml version="1.0" encoding="ISO-8859-1" ?>
<!DOCTYPE NFuseProtocol SYSTEM "NFuse.dtd">
<NFuseProtocol version="1.1">
<ResponseProtocolInfo>
<ServerAddress addresstype="no-change"></ServerAddress>
</ResponseProtocolInfo>
</NFuseProtocol>
```

Request 6: RequestAddress 860

```
POST /scripts/WPnBr.dll HTTP/1.1 Content-type: text/xml Host:
10.251.57.29:80 Content-Length: 422 Connection: Keep-Alive
<?xml version="1.0" encoding="ISO-8859-1"?> <!DOCTYPE
NFuseProtocol SYSTEM "NFuse.dtd"> <NFuseProtocol
version="1.1">
<RequestAddress>
<Name>
<UnspecifiedName>FARM1*</UnspecifiedName>
</Name>
<ClientName>sjmiked</ClientName> <ClientAddress
addresstype="dns-port" />
<ServerAddress addresstype="dns-port" /> <Flags />
<Credentials>
<UserName></UserName> <Domain></Domain> </Credentials>
</RequestAddress>
</NFuseProtocol>
```

Response 6: ResponseAddress 862

```
HTTP/1.1 200 OK Date: Fri, 02 Jun 2006 16:22:44 GMT Server:
Microsoft-IIS/6.0 MicrosoftOfficeWebServer: 5.0_Pub X-Powered-By:
ASP.NET Content-type: text/xml Content-length: 563
<?xml version="1.0" encoding="ISO-8859-1" ?>
<!DOCTYPE NFuseProtocol SYSTEM "NFuse.dtd">
<NFuseProtocol version="1.1">
<ResponseAddress>
<ServerAddress
addresstype="dot-port">10.251.57.26:1494</ServerAddress>
<ServerType>win32</ServerType>
```

-continued

```
<ConnectionType>tcp</ConnectionType>
<ClientType>ica30</ClientType>
<TicketTag>IMAHostId:13093</TicketTag>
<SSLRelayAddress addresstype="dns-
port">KPFARM1A.KPLAB.net:443</SSLRelayAddress>
<CGPAddress addresstype="port">2598</CGPAddress>
</ResponseAddress>
</NFuseProtocol>
```

In another embodiment, a monitoring agent of the appliance is designed, constructed or configured to determine the functional and operational state of a Web Interface service. In the Citrix Presentation Server environment, a Web Interface service or broker may provide a graphical user interface depiction of the remote access server farm, such as those depicted in FIGS. 5A-5B. The monitoring agent 820 may probe the Web Interface with a request and check whether or not the Web Interface is functional in addition to operational by inspecting any of the field, headers or payload of the response.

In some embodiments, the monitoring agent 820 transmits a request 850 to the Web Interface for a web page provided via the Web Interface. The request 850 may comprise any type and form of HTTP request, or any other markup language. In one embodiment, the monitoring agent 820 submits a request 850 for a default page. In other embodiments, the monitor agent 820 submits a request 850 for a home page. In another embodiment, the monitoring agent 820 submits a request 850 for a default site path for the logon pages for Web Interface based on the version of Citrix Presentation Server (as the remote access server) and/or version of the Web Interface:

| | |
|---|---|
| Web Interface 3.0 | /Citrix/MetaFrame/default/default.aspx |
| Web Interface 4.x | /Citrix/MetaFrame/auth/login.aspx |
| Web Interface 4.5 | /Citrix/AccessPlatform/ |

In other embodiments, the default site path for a logon page to the Web Interface is customizable or configurable. The monitoring agent 820 may be customized or configured to probe the Web Interface using the user specified logon page.

The monitoring agent 820 may receive a response 852 from the Web Interface. Receiving a response may indicate the Web Interface is operational. The monitoring agent 820 inspects the response for predetermined content to determine whether or not the Web interface is functional. In some embodiments, the monitoring agent 820 may verify the response includes a Set-Cookie header. In the embodiment of Citrix Presentation Server, a response from a Web Interface server having the set-cookie header indicate the Web Interface server is functional. In embodiments in which this header is not present in the response, the monitoring agent may determine the Web Interface may not be functional although operational. For example, if a web server for the Web Interface is experiencing problems, the response from the Web Interface may not include a set-cookie header.

In other embodiments, the monitoring agent 820 may determine the Web Interface is functional or not functional based on checking or verifying the response for a predetermined code or predetermined string. In some embodiments, the monitoring agent may check for a status code, such as 200 OK in an HTTP response. The following example illustrated a monitoring agent 820 script performs a check for a status code from a Web Interface Response:

```
add monitor wi_mon_resp200 HTTP -respcode 200 -httprequest "GET
/Citrix/MetaFrame/auth/login.aspx"
```

In yet another embodiment, the monitoring agent 820 may check if a unique string value is present in the response header or response body. For example, an HTTP-ECV Kernel Monitor 820 may be used to find a string pattern in the body of an HTTP response, but not the HTTP headers. The TCP-ECV monitor may be sued to find if the string that the monitor is trying to find is in the HTTP header. If the string is not found by the monitor, the service to which the monitor is bound is eventually marked as DOWN (based on the value of the retries parameter). The following commands create a TCP-ECV monitor 820 named 'wi_mon' for an embodiment of Web Interface version 4.x:

```
add monitor wi_mon_setcookie TCP-ECV -send "GET
/Citrix/MetaFrame/auth/login.aspx\r\n\r\n" -recv "Set-Cookie"
```

In some embodiments, the string "\r\n\r\n" is added to make the HTTP response valid and terminated. Otherwise, in one embodiment, the monitor 920 may make a malformed HTTP request to the server and may not receive an expected response. In yet another embodiment, a monitor may be established a Web Interface site using SSL, by configuring the secure parameter of the monitor to identify to use SSL. The following in another example of a monitoring agent 820 that looks for a unique string in the response from the Web Interface. In this example embodiment, the string is the name of a stylesheet rule that is applied to the 'Log in' button.

```
add monitor wi_mon_login_button HTTP-ECV -send "GET
/Citrix/MetaFrame/auth/login.aspx\r\n\r\n" -recv
"button_Apply_Join_Login"
```

Based on the monitoring agent 820 checking for a header value such as set-cookie, a predetermine code or a unique string, or any combination thereof, the monitoring agent 820 determines the functional state of the Web Interface. If these one or more content values of the response are as expected, the appliance 200 may consider the Web Interface operational and functional. If the responses do not have the expected content, the appliance 200 may determine the Web Interface is operational but not functional. If no response is received, the appliance 200 may determine the Web Interface is not operational. In some embodiments, the appliance includes operational and functional Web Interfaces in a load balancing rotation. In another embodiment, the appliances excludes operational and non-functional Web Interface from a load balancing rotation or otherwise load balancing decisions.

Although the components of the remote access server farm are generally described in the context of the Citrix Presentation Server Farm as the remote access system, any type and form of interface service performing any of the functions, operations or logic of the XML service may be used and/or any type and form of web based service performing any of the functions, operations or logic of the Web Service may be used in connection with systems and methods described herein. Furthermore, although the functional and operational state monitoring of these components are generally discussed in the context of the intermediary in a form of an appliance 200, the intermediary may comprise any type and form of intermediary on any computing device, such as an agent on the client 102 or the server 106, for example, the client agent depicted in FIG. 3.

Figure 8B:
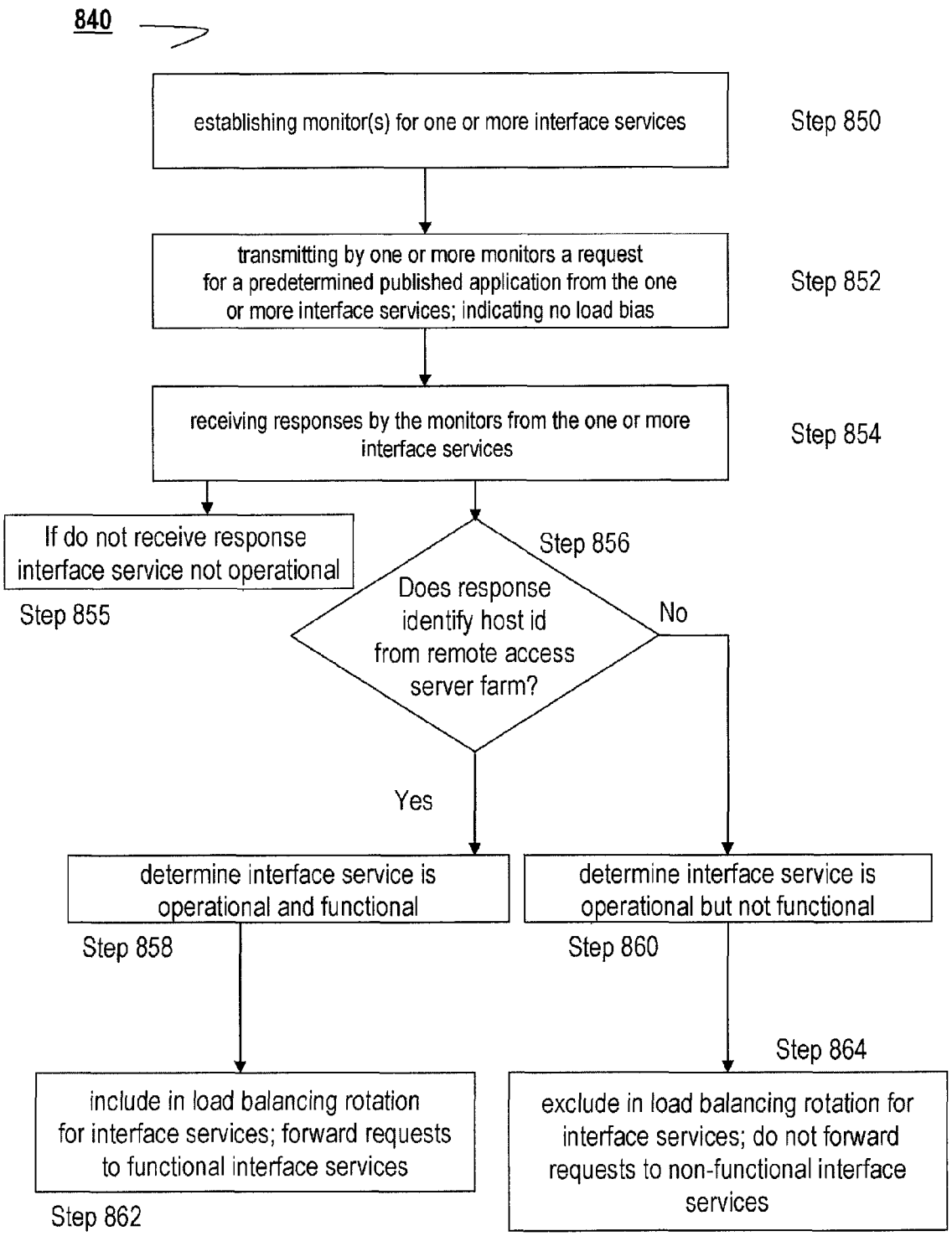
FIG. 8B is a flow diagram depicting an embodiment of steps of a method for determining the functional state of interface service components of a remote access server farm.

Referring now to FIG. 8B, an embodiment of a method to monitor a state of one or more interface service components of a remote access server farm, such as an XML service of a Citrix Presentation Server is depicted. In brief overview of method 840, at step 850 monitoring agents 820 for one or more interface services are established. At step 852, the monitoring agents transmits a request for a predetermined published application from the one or more interface services. At step 854, the monitoring agents 820 receive responses from the interface servers. At step 855, if the monitoring agent 820 does not receive a response from an interface service within a predetermined time or threshold, the appliance may determine the interface service is not operational. At 856, the monitoring agent 820 determines whether or not the response includes a host identifier for a server in the remote access server farm. If the response does not include a host identifier, the appliance at step 860 determines the interface service is operational but not functional. At step 864, the appliance excludes the not functional interface from a load balancing rotation such that client requests are not forwarded to non-functional interface services. If the response does include a host identifier, the appliance at step 858 determines the interface service is operational and functional. The appliance, at step 862, may include the operational and functional interface services in the load balancing rotation such that client request are forwarded to functioning interface services.

At step 850, any type of monitoring agent 820 may used to monitor a state of the interface services, such as the XML interface component of the Citrix Presentation Server remote access farm. In one embodiment, the monitoring agent 820 operates as a kernel-based monitor. In another embodiment, the monitoring agent 820 operates in user-mode. A monitoring agent may be bound to one or more VIPs 275 of the appliance. The monitoring agent 820 may operate to determine the functional state of the interface service. In some embodiments, one monitoring agent may monitor or probe one interface service. In other embodiments, one monitoring agent may monitor or probe a plurality of interface services. In yet another embodiment, a plurality of monitoring agents may monitor or probe a plurality of interface services.

At step 852, a monitoring agent 820 may transmit a request to one or more interface services to probe or monitor the interface service. The monitoring agent may request from an XML service an enumerated list of published applications from a remote access server farm. In some embodiments, the monitoring agent transmits a request for a predetermined published application via the interface services. In further embodiments, the request may include an indicator to identify to the interface service or any other component of the remote access server farm to not consider the request in load balancing metrics. For example, in one embodiment, the request includes a no load bias flag.

At step 854, the monitoring agents 820 received responses from the interface services. In some cases, a monitoring agent 820 does not receive a response from an interface service. In other cases, a monitoring agent receives a response with one or more error codes. In another case, the monitoring agent receives a response without any errors. In some embodiments, the monitoring agent receives a response with a host identifier of a server in the remote access server farm. In one embodiment, the monitoring agent receives a response including the host identifier of the least loaded server in the remote access server farm. In yet another embodiment, the monitoring agent receives an XML based response. In one embodiment, the XML based response includes a tag to identify the host identifier, such as the <tickettag> example in the embodiments of FIG. 8A.

At step 855, the monitoring agent 802 may determine that a response was not received from an interface service. In some embodiments, the monitoring agent 802 may wait for a predetermined time threshold for the response. In other embodiments, the monitoring agents 802 may retransmit the request a predetermined numbers of times. Based upon not receiving a response from the interface service, the monitoring agent or appliance 200 may identify the operational state of the interface service as not operational.

At step 856, the monitoring agent 802 determines whether or not a host identifier of a server from the remote access server farm is present and/or valid in the received response. The monitoring agent 802 may check for the existence of the host identifier in a location expected within the content of the response. In one embodiment, the monitoring agent 802 determines whether response includes a properly formed response. In some embodiments, the monitoring agent 802 determines whether the value, tag, name-value pair, line or other items in the response identifying the host are formatted or formed properly or as expected. In another embodiment, the monitoring agent 802 determines whether or not the host identifier comprises a predetermined number of characters or numbers. In some embodiments, the monitoring agent 820 checks the host identifier against a database, a cache or name service. In one embodiment, the monitoring agent 820 pings the host identifier to determine if the host is available. In another embodiment, the monitoring agent transmits an IMA ping to the host identified by the host identifier. In further embodiments, the monitoring agents 802 checks for any error codes or strings within the response.

If, at step 856, the response does not include the host identifier, a valid host identifier and/or the host identifier is otherwise determined to be unavailable, the monitoring agent and/or appliance may determine the interface service providing the response is operational and not functional. Although the interface service provides a response to indicate that the service is running, the response has content that indicates the interface service is not functioning as desired or expected. In one embodiment, the appliance 200 marks the interface service as having a down state or otherwise unavailable.

At step 864, the appliance 200 excludes in load balancing decisions the non-operational interface services and/or operational and non-functional interface services. For example, in one embodiment, upon detecting via the monitoring agent an interface service is not functional, the intermediary may exclude the non-functional interface service in the next load balancing rotation or traffic management decision. In this manner and in some embodiments, the appliance 200 avoids transmitting client requests to operational interface services that are not functioning properly or otherwise identified as non-functional. In other embodiments, the appliance 200 excludes the non-functional interface service from traffic management decisions until a predetermined time or upon detecting via a monitoring agent the interface service is functional.

If, at step 856, the response includes the host identifier, a valid host identifier and/or the host identifier is otherwise determined to be available, the monitoring agent and/or intermediary may determine the interface service providing the response is operational and functional. Although the interface service provides a response to indicate that the service is running, the response has content that indicates the interface service is also functioning as desired or expected. In one embodiment, the appliance 200 marks the interface service as having a UP state or otherwise is available.

At step 862, the appliance 200 includes in load balancing decisions the operational and functional interface services. For example, in one embodiment, upon detecting via the monitoring agent an interface service is functional, the intermediary may include the functional interface service in the next load balancing rotation or decision. In some embodiments, the interface service was previously included in the traffic management and/or load balancing decisions and the appliance maintains the inclusions of the functional interface service in these decisions. In another embodiment, the interface service may have been marked as down or unavailable and may not have been included in traffic management decisions. Upon detecting the interface service is functional, the interface service is marked up or available and included in traffic management decisions.

Figure 8C:
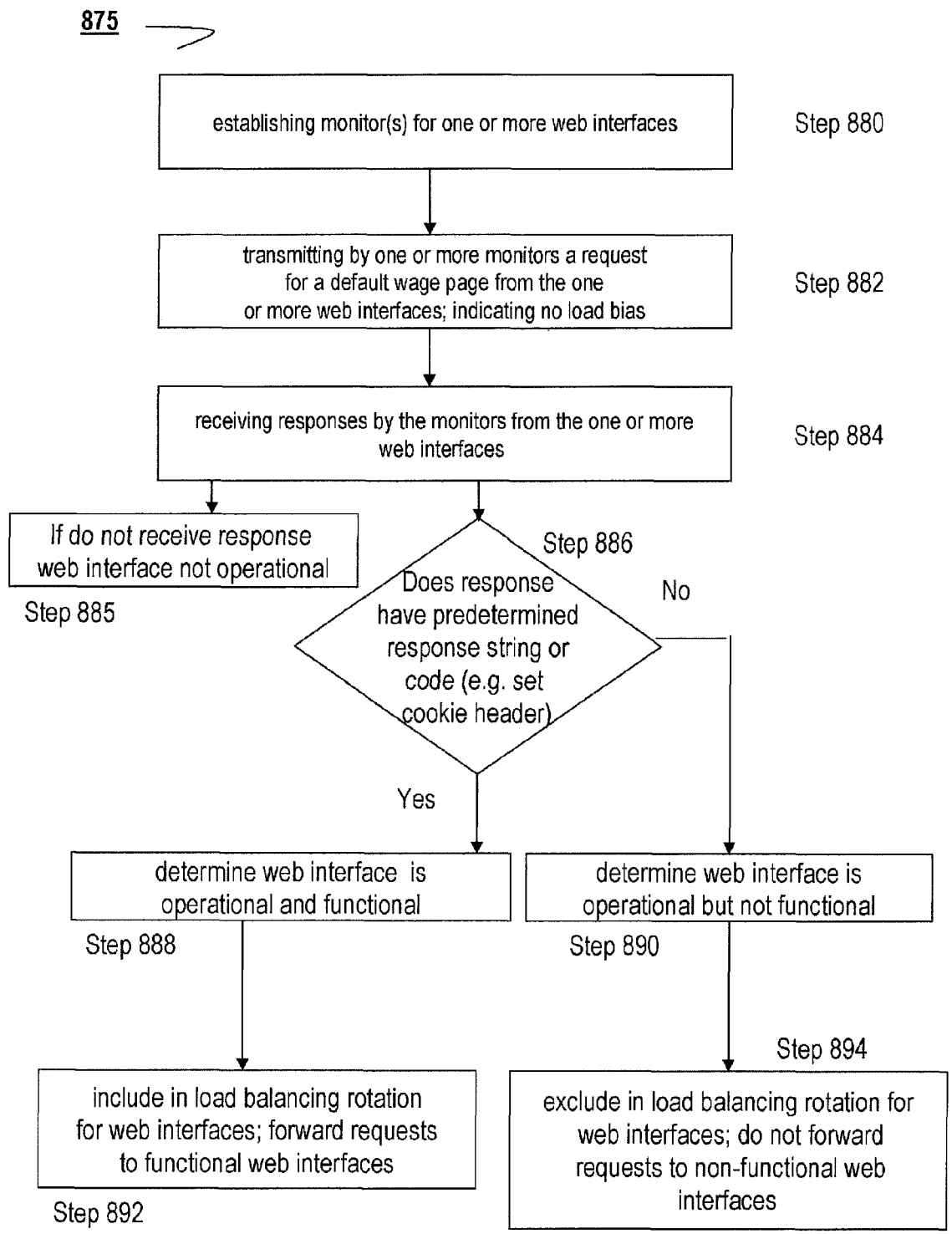
FIG. 8C is a flow diagram depicting an embodiment of steps of a method for determining the functional state of web interface components of a remote access server farm.

Referring now to FIG. 8C, an embodiment of a method to monitor a state of one or more web interface components of a remote access server farm, such as an Web Interface server or Broker of a Citrix Presentation Server is depicted. In brief overview of method 875, at step 880 monitoring agents 820 for one or more web interfaces are established. At step 882, the monitoring agents transmits a request for a web page from the one or more web interfaces. At step 884, the monitoring agents 820 receive responses from the web interfaces. At step 885, if the monitoring agent 820 does not receive a response from a web interface within a predetermined time or threshold, the appliance may determine the web interface is not operational. At 886, the monitoring agent 820 determines whether or not the response includes a predetermined response string or a code, such as a set-cookie header. If the response does not include the predetermined response string or code, the appliance, at step 888, determines the web interface is operational but not functional. At step 892, the appliance excludes the not functional web interface from a load balancing rotation such that client requests are not forwarded to non-functional web interfaces. If the response does include the predetermined response string or code, the appliance at step 890 determines the web interface is operational and functional. The appliance 200 at step 894 may include the operational and functional web interface in the load balancing rotation such that client requests are forwarded to functioning web interfaces.

At step 880, any type of monitoring agent 820 may used to monitor a state of a web interface, such as the Web Interface component of the Citrix Presentation Server remote access farm. In one embodiment, the monitoring agent 820 operates as a kernel-based monitor. In another embodiment, the monitoring agent 820 operates in user-mode. A monitoring agent may be bound to one or more VIPs 275 of the appliance 200. The monitoring agent 820 may operate to determine the functional state of the web interface. In some embodiments, one monitoring agent may monitor or probe one web interface. In other embodiments, one monitoring agent may monitor or probe a plurality of web interface. In yet another embodiment, a plurality of monitoring agents may monitor or probe a plurality of web interfaces.

At step 882, a monitoring agent 820 may transmit a request to one or more web interface to probe or monitor the web interface. The monitoring agent may request from the web interface a web page, In some embodiments, the monitoring agent transmits a request for a predetermined web page. In one embodiment, the monitoring agent transmits a login page to the remote access server farm, or any component thereof.

In another embodiment, the monitoring agent transmits a request for the default page or landing page for the Web Interface. In yet some embodiments, the monitoring agents transmits a request for a default page of the Web Interface based on the version of the Web Interface or the remote access server farm. In still other embodiments, the monitoring agents transmits a request for a login page. In further embodiments, the request may include an indicator to identify to the web service or any other component of the remote access server farm to not consider the request in load balancing metrics.

At step 884, the monitoring agents 820 received responses from the web interfaces. In some cases, a monitoring agent 820 do not receive a response from the web interface. In other cases, a monitoring agent receives a response with one or more error codes. In another case, the monitoring agent receives a response without any errors. In some embodiments, the monitoring agent receives a response with a predetermined string or code expected by the monitoring agent. In one embodiment, the monitoring agent receives a response including a set-cookie header. In yet another embodiment, the monitoring agent receives an HTTP based response. In one embodiment, the HTTP response includes a unique string identifying any element of the requested web page, such as a stylesheet.

At step 885, the monitoring agent 802 may determine that a response was not received from a web interface. In some embodiments, the monitoring agent 802 may wait for a predetermined time threshold for the response. In other embodiments, the monitoring agents 802 may retransmit the request a predetermined numbers of times. Based upon not receiving a response from the web interface, the monitoring agent or appliance 200 may identify the operational state of the web interface as not operational.

At step 886, the monitoring agent 802 determines whether or not the response has the predetermined string or code. The monitoring agent 802 may check for the existence of the predetermined string or code at a location expected within the content of the response. In some embodiments, the monitoring agent may check a header of the response. In other embodiments, the monitoring agent may check a body of the response. In one embodiment, the monitoring agent 802 determines whether response includes a properly formed response. In some embodiments, the monitoring agent 802 determines whether the value, tag, name-value pair, line or other items in the response identifying the predetermined string or code are formatted or formed properly or as expected. In another embodiment, the monitoring agent 802 determines whether or not the predetermined string or code comprises a predetermined number of characters or numbers. In some embodiments, the monitoring agent 820 checks the predetermined string or response against a table, database, a cache or name service. In further embodiments, the monitoring agents 802 checks for any error codes or strings within the response.

If, at step 888, the response does not include the predetermined string or code, such as the set-cookie header, the monitoring agent and/or appliance may determine the web interface providing the response is operational and not functional. Although the web interface provides a response to indicate that the service is running, the response has content that indicates the web interface is not functioning as desired or expected. In one embodiment, the appliance 200 marks the web as having a down state or otherwise unavailable.

At step 892, the appliance 200 excludes in load balancing decisions the non-operational web interfaces and/or operational and non-functional web interfaces. For example, in one embodiment, upon detecting via the monitoring agent a web interface is not functional, the intermediary may exclude the non-functional web interface in the next load balancing rotation or traffic management decision. In this manner and in some embodiments, the appliance 200 avoids transmitting client requests to operational web interfaces that are not functioning properly or otherwise identified as non-functional. In other embodiments, the appliance 200 excludes the non-functional web interface from traffic management decisions until a predetermined time or upon detecting via a monitoring agent that the web interface is functional.

If, at step 890, the response includes the predetermined response string or code, such as the set-cookie header, the monitoring agent and/or appliance may determine the interface service providing the response is operational and functional. Although the web interface provides a response to indicate that the service is running, the response has content that indicates the web interface is also functioning as desired or expected. In one embodiment, the appliance 200 marks the web interface as having an UP state or otherwise is available.

At step 894, the appliance 200 includes in load balancing decisions the operational and functional web interfaces. For example, in one embodiment, upon detecting via the monitoring agent a web interface is functional, the appliance may include the functional web interface in the next load balancing rotation or decision. In some embodiments, the web interface was previously included in the traffic management and/or load balancing decisions and the appliance maintains the inclusion of the functional web interface in these decisions. In another embodiment, the web interface may have been marked as down or unavailable and may not have been included in traffic management decisions. Upon detecting the web interface is functional, the web interface is marked up or available and included in traffic management decisions.

In view of the structure, functions and operations of the systems and methods described herein, the appliance provides for the monitoring of functional state of components of remote access server farms to improve the reliability, usability and access by users to the server farm. appliance provided failover protection and load balancing based on the functional state of these components, which takes into account some of these components dependencies on other services and components. Furthermore, the system and methods described herein extent site fail-over capability to all end points and access methods as well as to additional data centers. The appliance ensures users are not routed to non-functional Web Interface and XML interface services of a presentation server farm.

These systems and methods reduce the vulnerability of access due to untrapped failures of any of the components of the remote access server farm. The deployment of the appliance as depicted herein helps contain any farm-wide failure so that the impact is limited to an inability to enumerate and launch applications in the failing farm. The deployment of the appliance helps contact any failure of a single component so that there is no impact on the end user. Furthermore, the deployment of the appliance also helps contain multiple component failures so that performance degradation is no more than equal to the number of failing components. As the size and complexity of an environment for a remote access server farm grows, the appliances helps maintain or mitigate the risks from these associated complexities. This helps reduce the coordination between multiple internal and external groups involved with the maintenance and administration of the environment.

What is claimed:

1. A method to monitor a state of one or more components of a remote access server farm by an intermediary to distinguish between operating and functional components and improve farm availability for user application requests, the intermediary deployed between a client and the remote access server farm and forwarding client requests to functional components of the remote access server farm, the method comprising the steps of:

(a) transmitting, by one or more monitoring agents of an intermediary deployed between a client and a remote access server farm, a request for availability of a predetermined application to each of a plurality of interface services providing an enumerated list of published applications available via a server in the remote access server farm;

(b) receiving, by one monitoring agent of the one or more monitoring agents, a first response to the request from a first interface service, the first response comprising a host identifier of the server of the remote access server farm available for providing the predetermined application;

(c) identifying, by the intermediary from the first response, that the first interface service is operational and functional;

(d) receiving, by one monitoring agent of the one or more monitoring agents, a second response to the request from a second interface service, the second response not identifying a host of the remote access server farm for providing the predetermined application; and (e) determining, by the intermediary from the second response, that the second interface service is operational and not functional.

2. The method of claim 1, wherein step (d) comprises not receiving the second response from the second interface service, and step (e) comprises determining, by the intermediary, the second interface service is not operational.

3. The method of claim 1, further comprising identifying, by the intermediary, exclusion of operational and not functional interface services in a load balancing rotation of interface services.

4. The method of claim 1, further comprising identifying, by the intermediary, inclusion of operational and functional interface services in a load balancing rotation of interface services.

5. The method of claim 1, wherein step (b) further comprises receiving the first response providing the host identifier of the least loaded server in the remote access server farm.

6. The method of claim 1, further comprising the steps of:

(f) receiving, by the intermediary, a request from a client for an enumerated list of published applications available from the remote access server farm; and (g) determining, by the intermediary, to distribute the client request to a functional and operational interface service of the plurality of interface services.

7. The method of claim 1, further comprising the steps of:

(f) receiving, by the intermediary, a third response from the second interface service, the third response comprising the host identifier of the server from the remote host server farm for providing the predetermined application; and (g) determining, by the intermediary from the third response, the second interface service is operational and functional.

8. The method of claim 1, wherein the interface service comprises an XML service providing the enumerated list of published applications available from a presentation server farm.

9. The method of claim 1, wherein step (a) further comprises transmitting the request to comprise an indication to not adjust a load of a server in the remote access server farmer based on the request.

10. The method of claim 1, wherein step (c) further comprises determining from the first response a host cache on the server providing the first interface service is valid.

11. A system to monitor a state of one or more components of a remote access server farm by an intermediary device to distinguish between operating and functional components and improve farm availability for user application requests, the intermediary device deployed between a client and the remote access server farm and forwarding client requests to functional components of the remote access server farm, the system:

an intermediary device deployed between a client and a remote access server farm, the intermediary device comprising one or more monitoring agents monitoring the state of one or more components of the remote access server farm;

a monitoring agent of the one or more monitoring agents transmits a request for availability of a predetermined application to each of a plurality of interface services providing an enumerated list of published applications available via a server in the remote access server farm and receives from a first interface service a first response to the request that comprises a host identifier of the server of the remote access server farm available for providing the predetermined application;

wherein the monitoring agent from a second interface service receives a second response to the request that does not identify a host of the remote access server farm for providing the predetermined application; and wherein the intermediary device determines from the first response that the first interface service is operational and functional and determines from the second response that the second interface service is operational and not functional.

12. The system of claim 11, wherein the monitoring agent does not receive the second response from the second interface service, and the intermediary device determines that the second interface service is not operational.

13. The system of claim 11, wherein the intermediary device excludes operational and not functional interface services in a load balancing rotation of interface services.

14. The system of claim 11, wherein the intermediary device includes operational and functional interface services in a load balancing rotation of interface services.

15. The system of claim 11, wherein the monitoring agent receive the first response providing the host identifier of the least loaded server in the remote access server farm.

16. The system of claim 11, wherein the intermediary device receives a request from a client for an enumerated list of published applications available from the remote access server farm and determines to distribute the client request to a functional and operational interface service of the plurality of interface services.

17. The system of claim 11, wherein the intermediary device receives from the second interface service a third response comprising the host identifier of the server from the remote host server farm for providing the predetermined application and determines that the second interface service is operational and functional.

18. The system of claim 11, wherein the interface service comprises an XML service providing the enumerated list of published applications available from a presentation server farm.

19. The system of claim 11, wherein the monitoring transmits the request comprising an indication to not adjust a load of a server in the remote access server farmer based on the request.

20. The system of claim 11, wherein the intermediary device determines from the first response a host cache on the server providing the first interface service is valid.

* * * * *